US012724967B2

(12) United States Patent
Roy et al.

(10) Patent No.: US 12,724,967 B2

(45) Date of Patent: Sep. 1, 2026

(54) MULTI-TASK LEARNING FOR NATURAL LANGUAGE PROCESSING TASKS USING A SHARED PRE-TRAINED LANGUAGE MODEL

(71) Applicant: Oracle International Corporation, Redwood Shores, CA (US)

(72) Inventors: Suman Roy, Bangalore (IN); Srijon Sarkar, Bangalore (IN); Siddhant Jain, Bangalore (IN); Saransh Mehta, Navi Mumbai (IN); Arpit Katiyar, Noida (IN); Shahid Reza, Bengaluru (IN); Pramir Sarkar, Bangalore (IN); Purushotam Gopaldas Radadia, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 165 days.

(21) Appl. No.: 18/435,174

(22) Filed: Feb. 7, 2024

(65) Prior Publication Data

US 2025/0252261 A1 Aug. 7, 2025

(51) Int. Cl.
*G06F 40/284* (2020.01)
*G06F 16/35* (2019.01)
(Continued)

(52) U.S. Cl.
CPC ............ *G06F 40/295* (2020.01); *G06F 16/35* (2019.01); *G06F 40/284* (2020.01)

(58) Field of Classification Search
CPC ........ G06F 40/30; G06F 40/35; G06F 40/295; G06F 40/284; G06F 40/56; G06F 16/3344; G06F 40/279; G06F 16/288; G06F 40/20
See application file for complete search history.

(56) References Cited

U.S. PATENT DOCUMENTS 9,965,726 B1 * 5/2018 Tablan .................. G06N 20/00
2013/0035961 A1 * 2/2013 Yegnanarayanan .... G16H 10/60 705/3
(Continued)

FOREIGN PATENT DOCUMENTS

WO 2023097616 A1 6/2023

OTHER PUBLICATIONS

Li et al, "A comparative study of pre-trained language models for named entity recognition in clinical trial eligibility criteria from multiple corpora", Sep. 2022, BMC medical informatics and decision making. Sep. 6, 2022;22(Suppl 3):235. (Year: 2022).*
(Continued)

*Primary Examiner* — Olujimi A Adesanya
(74) *Attorney, Agent, or Firm* — Kilpatrick Townsend & Stockton LLP

(57) ABSTRACT

Disclosed are machine learning techniques directed to training a machine learning model for the combined learning of multiple natural language processing (NLP) tasks. The NLP tasks may be named entity recognition (NER), relation extraction (RE), and assertion detection (AD) tasks. The machine learning model may be a multi-layer transformer model. Training the machine learning model may involve first training the NER module on the NER task, and thereafter training the RE module on the RE task while the AD module is simultaneously trained on the AD task. Training the machine learning model may alternatively involve training the NER module on the NER task concurrently with training the RE module on the RE task and training the AD module on the AD task. The trained machine learning model can predict entities and entity types in newly provided text, along with relations between the entities and assertions associated with the entities.

20 Claims, 10 Drawing Sheets

(51) Int. Cl.
*G06F 40/295* (2020.01)
*G06N 5/04* (2023.01)

(56) References Cited

U.S. PATENT DOCUMENTS

| | | | | |
|---|---|---|---|---|
| 2014/0156579 | A1* | 6/2014 | Bouchard | G06F 16/9535 706/46 |
| 2017/0024375 | A1* | 1/2017 | Hakkani-Tur | G06F 16/337 |
| 2019/0130275 | A1 | 5/2019 | Chen et al. | |
| 2021/0174027 | A1* | 6/2021 | Ambati | G06F 40/279 |
| 2021/0224651 | A1 | 7/2021 | Crone et al. | |
| 2022/0083739 | A1* | 3/2022 | Magnusson | G06N 3/09 |
| 2023/0316003 | A1* | 10/2023 | Friedman | G06N 3/0442 704/9 |
| 2024/0330579 | A1* | 10/2024 | Saxena | G06F 40/106 |

OTHER PUBLICATIONS

Bhatia et al, "Joint entity extraction and assertion detection for clinical text", Jul. 2019, InProceedings of the 57th Annual Meeting of the Association for Computational Linguistics Jul. 2019 (pp. 954-959). (Year: 2019).*

Yang et al, "Extracting family history of patients from clinical narratives: exploring an end-to-end solution with deep learning models", Dec. 2020, JMIR Medical Informatics. Dec. 15, 2020;8(12):e22982. (Year: 2020).*

Fabregat et al, "Negation-based transfer learning for improving biomedical Named Entity Recognition and Relation Extraction", Feb. 2023, Journal of Biomedical Informatics. Feb. 1, 2023;138:104279. (Year: 2023).*

Bhatia et al, Comprehend medical: a named entity recognition and relationship extraction web service< 2019, In2019 18th IEEE International Conference on Machine Learning And Applications (ICMLA) Dec. 16, 2019 (pp. 1844-1851). IEEE. (Year: 2019).*

Wan et al, "Joint Extraction of Nested Entities and Relations Based on Multi-task Learnin", Aug. 2023,. InInternational Conference on Knowledge Science, Engineering and Management Aug. 9, 2023 (pp. 368-382). Cham: Springer Nature Switzerland. (Year: 2023).*

"Introduction to Multi-Task Learning (MTL) for Deep Learning", retrieved from https://www.geeksforgeeks.org/introduction-to-multi-task-learningmtl-for-deep-learning/, Accessed from Internet on Aug. 23, 2023, pp. 1-9.

"Multi-Task Learning in ML: Optimization & Use Cases", retrieved from https://www.v7labs.com/blog/multi-task-learning-guide#h3, Accessed from Internet on Aug. 23, 2023, pp. 1-34.

Bose , et al., "A Survey on Recent Named Entity Recognition and Relationship Extraction Techniques on Clinical Texts", Applied Sciences, vol. 11, No. 18, Sep. 8, 2021, 69 pages.

Narayanan , et al., "Unified Concept and Assertion Detection Using Contextual Multi-task Learning in a Clinical Decision Support System", Journal of Biomedical Informatics, vol. 122, Oct. 2021, pp. 1-25.

Rotman , et al., "Multi-task Active Learning for Pre-trained Transformer-based Models", Computer Science, Transactions of the Association for Computational Linguistics, Oct. 28, 2022, 19 pages.

Wang , et al., "Towards Effective Multi-Task Interaction for Entity-Relation Extraction: A Unified Framework with Selection Recurrent Network", Computation and Language, Feb. 15, 2022, 13 pages.

* cited by examiner

Task Pipeline with specific inputs and outputs

Continue Abraxane, patient is not taking Tyleno 325 mg and he is advised calcium carbonate. Patient also stopped taking colecalciferol 1,000 units PO.

MULTI-TASK LEARNING FOR NATURAL LANGUAGE PROCESSING TASKS USING A SHARED PRE-TRAINED LANGUAGE MODEL

FIELD

The present disclosure relates generally to artificial intelligence techniques, and more particularly, to techniques for multi-task learning of named entity recognition, relation extraction, and assertion detection using a shared pre-trained language model.

BACKGROUND

Natural Language Processing (NLP) is a subfield of artificial intelligence (AI) that focuses on the interaction between computers and humans using natural language. The goal of NLP is to enable machines to understand, interpret, and generate human language in a way that is both meaningful and contextually relevant. NLP can be utilized in many fields including, without limitation, medical research, clinical health practice, search engines, business intelligence, and digital or virtual assistants. For example, in clinical health practice, NLP can be used to summarize large volumes of text, to perform automatic doctor-patient speech recognition, or to identify PII/PHI information. In order to accomplish this goal independent of the field of use, NLP involves a combination of linguistic and computational methods or tasks to enable computers to understand, interpret, and generate human language. Examples of these linguistic and computational methods or tasks include text parsing and tokenization, part-of-speech tagging, syntactic and semantic analysis, named entity recognition, relation extraction, coreference resolution, assertion detection, sentiment analysis, and machine learning and deep learning. These methods or tasks collectively enable computers to process and understand natural language, making it possible to perform various jobs such as text summarization, machine translation, question answering, and more.

Named entity recognition (NER), relation extraction (RE), and assertion detection (AD) are specific methods or tasks within NLP that involve extracting structured information from unstructured text. NER is a task in which the goal is to identify and classify entities within a text. Entities are typically real-world objects such as names of people, organizations, locations, dates, numerical values, etc. For example, in the sentence "Oracle Corporation is headquartered in Austin, Texas," NER would identify "Oracle Corporation" as an organization and "Austin, Texas" as a location. RE involves identifying and classifying relationships between entities mentioned in a text. The goal is to understand how different entities are connected or associated with each other. In the sentence "Bruce Wayne was born in Gotham City," RE would identify the relationship "born in" between the entities "Bruce Wayne" and "Gotham City." AD is the task of determining the truth value or certainty of a given statement in a text. It aims to identify whether a statement is asserted as a fact, negated, or uncertain. In the sentence "Bruce Wayne has a butler," AD would recognize the statement as a positive assertion on the entity "butler." In contrast, in "I don't think Bruce Wayne has a butler," AD would recognize a negation on the entity "butler." These tasks are crucial for extracting structured information from unstructured text data, enabling computers to understand relationships between entities and make sense of the meaning conveyed in natural language. NER, RE, and AD are often used in various applications, including information retrieval, knowledge graph construction, and automated question answering systems.

BRIEF SUMMARY

Techniques disclosed herein relate generally to the use of AI, such as machine learning (ML), to perform natural language processing. More specifically, a multi-task learning framework provides an end-to-end solution in which a single machine learning model (a unified model) is trained to perform NER, RE, and AD tasks using shared representations for extracting named entities, relations, and assertions and then the trained unified model can predict appropriate entities, relations, and assertions for unlabeled data during inference. The unified model can be trained using one of two approaches—in the first approach (partial pipelined), the unified model is trained for the NER task using NER task-dedicated layers until convergence, followed by training the unified model for both the RE and AD tasks simultaneously, and in the second approach (multi-task learning), a multi-task learning approach is used to train the unified model on all the tasks (NER, RE, and AD) jointly in which the gradient is balanced for optimal model training. The multi-task learning framework can be customized, in a sense that sequence-to-sequence modeling may be used for NER instead of a span-based framework and/or the multi-task learning framework can be used with various assertion modalities (or labels). With the unified model appropriately trained, inference can be performed (e.g., serving of the model during production or inference phase). During inference, new and unlabeled textual data, such as the text contained in a new document, can be input to the trained unified model and the trained unified model can predict appropriate entities, relations between the entities, and assertion classes within the unlabeled textual data.

In various embodiments, a computer-implemented method is provided that includes: accessing original data as text comprising a sequence of words; constructing input data by labeling the text to identify entities, relations between the entities, and assertion classes associated with the entities; inputting the input data to a named entity recognition (NER) module of a machine learning model; outputting, by the NER module as relation extraction input data to a relation extraction (RE) module of the machine learning model, pairs of spans with entity type information; outputting, by the NER module as assertion detection input data to an assertion detection (AD) module of the machine learning model, spans with mapped entities; training the machine learning model on combined NER, RE, and AD tasks to generate a trained machine learning model, by training the NER module on the input data, training the RE module on the relation extraction input data, and training the AD module on the assertion detection input data; and providing the trained machine learning model. In some instances, the providing comprises deploying the trained machine learning model for use in an inference phase. The inference phase may comprise inputting to the trained machine learning model, new text comprising a new sequence of words; and predicting, by the trained machine learning model, entities and entity types present within various spans of the new text, relations between the entities, and assertions associated with the entities.

In some embodiments, training the machine learning model is performed using a partial pipelined approach, whereby the NER module of the machine learning model is trained on the NER task using the input data in a first training phase, and after training of the NER module on the NER task, the RE module is trained on the RE task using the relation extraction input data while the AD module is simultaneously trained on the AD task using the assertion detection input data in a second training phase.

In some embodiments, a total loss function is associated with the partial pipelined model training approach and is expressed by the equation:

$$L_{\{total\}} = R(W) + v_r(t)[R(W_r) + L_r(W_r, W)] + v_a(t)[R(W_a) + L_a(W_a, W)]$$

where $$R(W_i) = \frac{\lambda_i}{2}\sum_{\{w \in W_i\}} \|w\|_2^2,$$

$i \in \{r\ a\}$ and where $$\|\cdot\|_2^2$$

denotes the $l_2$-norm of a vector.

In some embodiments, training the machine learning model is performed using a concurrent learning approach, whereby training of the NER module of the machine learning model on the NER task using the input data occurs concurrently with training of the RE module on the RE task using the relation extraction input data and training of the AD module on the AD task using the assertion detection input data.

In some embodiments, a total loss function is associated with the concurrent learning model training approach and is expressed by the equation:

$$L_{\{total\}} = R(W) + v_n(t)[R(W_n) + L_r(W_n)] + v_r(t)[R(W_r) + L_r(W_r, W)] + v_a(t)[R(W_a) + L_a(W_a, W)]$$

In some embodiments, the computer-implemented method further includes modeling the NER task as a sequence tagging problem where the input data is provided as a sequence of tokens of length n, and is labeled by one of m distinct entity tags of a group of selected or otherwise available entity tags; and a sequence of entity tags is predicted for every sequence of tokens, such that each token in the input data is mapped to one of the distinct entity tags m of the group of entity tags.

In some embodiments, where the NER task is modeled as a sequence tagging problem, after all the tokens in the input data are labeled by entity tags, at least some adjacent tokens with a common entity type label are combined to form spans; all the spans in the input data are enumerated; and entity types are associated with each span.

In some embodiments of the computer-implemented method, model training parameters are shared between the NER, RE, and AD modules.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
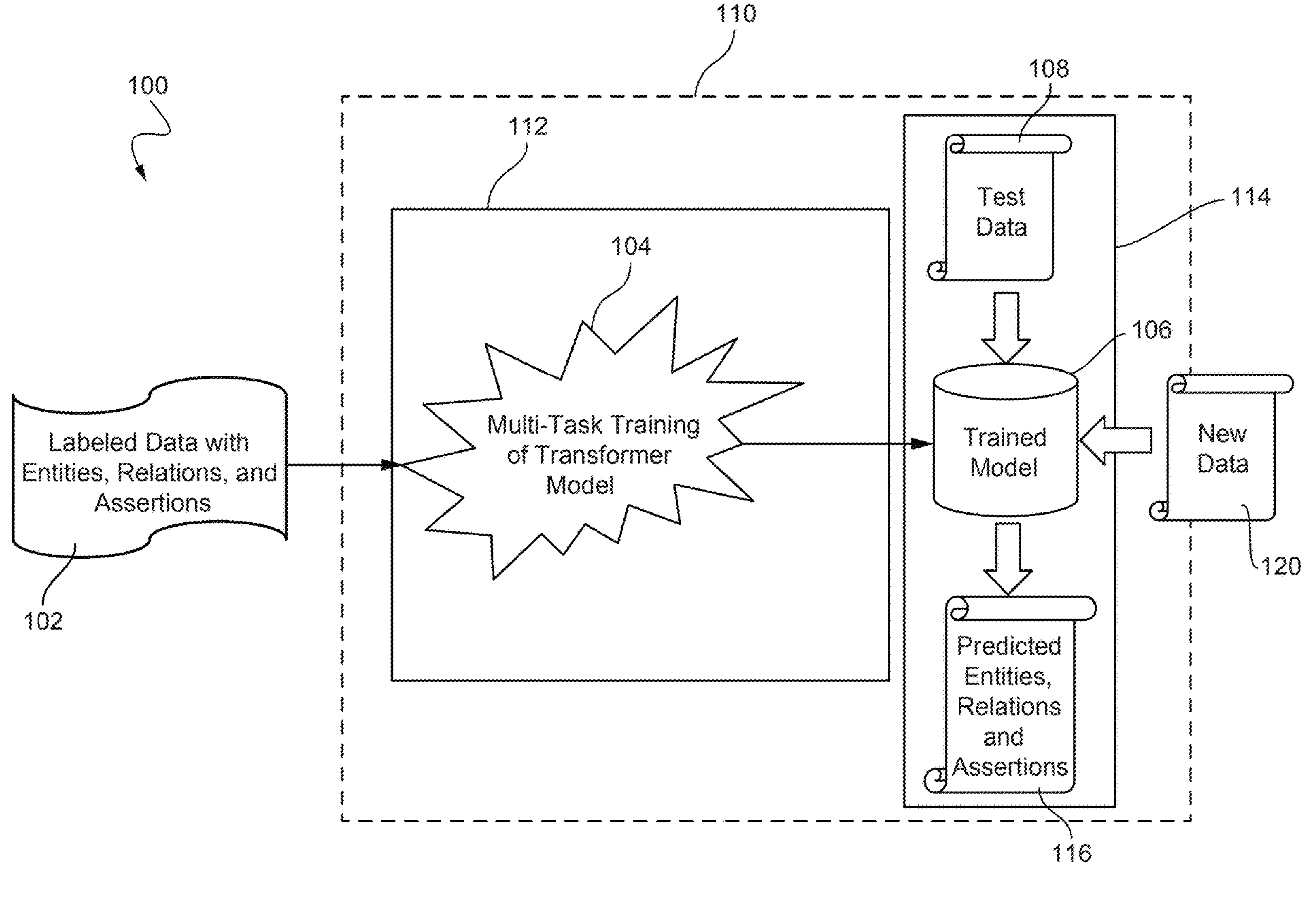
FIG. 1 shows a schematic diagram of a multi-task learning framework in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Artificial intelligence (AI) techniques have many natural language processing (NLP) applications. In a medical setting, AI can be broadly applied to drug discovery, and can be used to diagnose disease, to predict disease, to provide a disease prognosis, to identify potential drug interactions, for medical imaging analysis, and for other purposes. AI techniques such as named entity recognition (NER) techniques can be used to identify and classify entities in medical and other text. Additional NLP techniques such as relation extraction (RE) and assertion detection (AD) can be used in conjunction with NER to enhance the natural language processing of textual information. AI may also be usable to improve doctor-patient communications, patient care, or the patient experience, such as by function as a physician's assistant or otherwise. machine learning models can also be trained for automatic speech recognition, summarization, and personal identifiable information (PII) or protected health information (PHI) detection.

In order for an AI (e.g., machine learning) model to properly perform textual NLP operations, the machine learning model needs to be able to recognize and understand the meaning of text as written by humans. For example, when a machine learning model is used in a medical setting for entity extraction, summarization, PII/PHI detection, etc., the machine learning model needs to be able to recognize and understand medical-related entities in text. By training a machine learning model on NLP tasks such as RE and AD in conjunction with NER, the machine learning model can be made to better understand the meaning of textual data. For example, training a machine learning model on RE in conjunction with NER allows the trained machine learning model to better recognize the relationships between various entities (e.g., a patient entity and a drug entity identified within given text), which can be of high importance when extracting structured information from unstructured (unlabeled) input data. Training a machine learning model to perform RE tasks can result in better performance when the trained model is subsequently used to perform question answering, sentiment analysis, structured searching and other NLP-related tasks. Likewise, training a machine learning model on AD in conjunction with NER allows the trained machine learning model to better understand speaker intentions (e.g., statements versus questions), context, and other characteristics and nuances of a textual data input, which can be helpful when the trained model is subsequently used to perform sentiment analysis, question answering, extraction, summarization, and other NLP-related tasks.

While all three of these techniques can be important to natural language processing, known methods for training a model to perform said techniques have been inefficient from both a time and resource standpoint. For example, most known methods of training have involved a pipelined approach using multiple models, where one model is trained to identify and extract named entities, another model is trained to classify relations between the entities, and yet another model is trained to identify an assertion class (fact, negated, uncertain, present, possible, absent, etc.) for a span or entities in the text. Training separate machine learning models in this manner is time consuming and resource inefficient. Recent research has demonstrated that the tasks of NER and RE can be modeled jointly, by formulating them in one structured prediction engine, or modelling them in a multi-task learning through shared representations. However, task AD is not modelled as part of these efforts, nor is multi-task modelling employed in a shared layered architecture of a machine learning model such as a pre-trained language model.

Accordingly, different approaches are needed to address these challenges and others. The developed approaches described herein use a multi-task learning framework in which a single machine learning model (e.g., a single pretrained language model with a transformer-based architecture) is jointly trained with annotated data from NER, RE and AD tasks using shared representations. A few layers (NER module) on the bottom of the machine learning model architecture are allocated to the NER task so that whole input text can be fed as input and used to learn model parameters of these layers for entity types. The last few layers are duplicated and allocated respectively for RE and AD respectively (RE and AD modules). The output of NER module is fed to both copies of the last few layers for the RE and AD modules and used to learn model parameters of these layers for classifying relationships and assertion types. For multi-task learning, an additive loss function of the tasks can be used in order to improve performance and speed of the model. However, it can be difficult to train multi-task networks because one needs to balance the training of different tasks so that network parameters converge to features that are to be shared across all the tasks. To address this challenge, a gradient normalization approach can be used for the multi-task learning that automatically balances training in multi-task models by dynamically tuning gradient magnitudes. The multi-task learning framework has been demonstrated to produce reasonable accuracy for all the tasks and yield efficient latency time for learning all the tasks.

In various embodiments, a computer-implemented method is provided that includes: obtaining original data as text comprising a sequence of words; constructing input data by labeling the text to identify entities, relations between the entities, and assertion classes associated with the entities; inputting the input data to a named entity recognition (NER) module of a machine learning model; outputting, by the NER module as relation extraction input data to a relation extraction (RE) module of the machine learning model, pairs of spans with entity type information; outputting, by the NER module as assertion detection input data to an assertion detection (AD) module of the machine learning model, spans with mapped entities; training the machine learning model on combined NER, RE, and AD tasks to generate a trained machine learning model, by training the NER module on the input data, training the RE module on the relation extraction input data, and training the AD module on the assertion detection input data; and providing the trained machine learning model. In some instances, the providing comprises deploying the trained machine learning model for use in an inference phase. The inference phase may comprise inputting to the trained machine learning model, new text comprising a new sequence of words; and predicting, by the trained machine learning model, entities and entity types present within various spans of the new text, relations between the entities, and assertions associated with the entities.

In some instances, training the machine learning model is performed using a partial pipelined approach, whereby the NER module of the machine learning model is trained on the NER task using the input data in a first training phase, and after training of the NER module on the NER task, the RE module is trained on the RE task using the relation extraction input data while the AD module is simultaneously trained on the AD task using the assertion detection input data in a second training phase.

In some instances, training the machine learning model is performed using a concurrent learning approach, whereby training of the NER module of the machine learning model on the NER task using the input data occurs concurrently with training of the RE module on the RE task using the relation extraction input data and training of the AD module on the AD task using the assertion detection input data.

Multi-Task Learning Framework

A. Overview of the Multi-Task Learning Framework

As is generally represented in FIG. 1, a multi-task learning framework 100 is utilized for the combined learning of NER, RE, and AD natural language processing tasks. The multi-task learning framework 100 inputs data 102 to a single machine learning model 104 (e.g., a pretrained language model with a transformer architecture) to generate a trained model 106 through combined learning of the NER, RE and AD tasks. The data 102 may be accessed within one or more computing systems comprising one or more storage devices (e.g., a database). The one or more computing systems many be on premise, remote, virtual, or any combination thereof and the data 102 may be private, public, or a combination thereof. For example, the data 102 may comprise Electronic Health Record (EHR) data, which is as an electronic version of one or more patients' medical history, that is maintained by one or more providers over time, and may include all the key administrative clinical data relevant to that persons care under a particular provider, including demographics, progress notes, problems, medications, etc. The EHR data may be provided by a health care customer via their hospital information system or one or more other computing systems.

The data 102 includes input features and corresponding correct output labels for NER, RE and AD tasks. The input features are text comprising spans, which are continuous sequences of elements within the text, such as tokens, words, or characters. NLP models often operate on spans to understand the structure and meaning of language within a given context. The output "labels" refer to the reference or ground truth against which the model's predictions are evaluated. With respect to the NER task, the labels represent different types of named entities (e.g., person, organization, currency, date/time, etc.) that the model is trained to identify and classify within a text. With respect to RE, the labels are used to define the types of relationships or connections between entities mentioned in a text (e.g., cause-effect, part-whole, entity-destination, etc.) and help the model understand and classify the nature of the associations between pairs of entities. With respect to AD, the labels are used to categorize the level of certainty or belief (e.g., asserted as a fact, negated, or uncertain) expressed in a span or statement of a text. These labels help classify the attitude or stance expressed in a given statement, allowing the model to understand the speaker's perspective or confidence level. The output labels for the text will depend on the specific domain for which the NER, RE and AD tasks are being performed (e.g., labels provided for text from the healthcare domain may be different those labels used for text from the financial domain).

The data 102 may be split into training and validation datasets as well as a testing dataset 108. The splitting may be performed randomly (e.g., 70% training, 15% validating, and 15% testing) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. The training portion of the data is used to train the machine learning model 104 to learn the learnable parameters (e.g., weights and biases), while the validating portion is used for tuning hyper-parameters and selecting the optimal non-learnable parameters (e.g., parameters that are not updated during training). The testing portion of the data (testing dataset 108) represents data the machine learning model 104 has never seen before in order to estimate the general performance of the trained model 106.

Once the data 102 is split, it can be used by a modeling subsystem 110 for the combined learning of NER, RE, and AD tasks. The modeling subsystem 110 includes a model training subsystem 112 for training and validating a machine learning model in a training phase and the model inference subsystem 114 for testing and eventual deployment and use of the machine learning model in an inference phase. The model training subsystem 112 comprises two systems: a trainer and a validator for training and validating machine learning algorithms to be used by the other subsystems, such as the model inference subsystem 114 for performing the NER, RE and AD tasks.

The trainer and validator are part of a machine learning operationalization framework comprising hardware such as one or more processors (e.g., a CPU, GPU, TPU, FPGA, the like, or any combination thereof), memory, and storage that operates software or computer program instructions (e.g., TensorFlow, PyTorch, Keras, and the like) to execute arithmetic, logic, input and output commands for the machine learning model. More specifically, the trainer performs iterative operations of training that involve inputting portions of the data 102 into machine learning algorithms to find a set of model parameters (e.g., weights and/or biases) that minimize objective functions (e.g., loss/error function, cost function, modified cross entropy loss, etc.). The objective function can be constructed to measure the difference between the outputs inferred using the models (e.g., predicted classes for entities) and the ground truth (e.g., determined entity classes) annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of Y. Various different techniques may be used to learn this hypothesis function. In some machine learning algorithms, such as neural networks, this is done using back propagation. The current error is typically propagated backwards to a previous layer, where it is used to modify the weights and biases in such a way that the error is minimized. The weights are modified using the optimization function. Optimization functions usually calculate the error gradient (i.e., the partial derivative of the objective function with respect to the weights) and the weights are modified in the opposite direction of the calculated error gradient. For example, techniques, such as back propagation, random feedback, Direct Feedback Alignment (DFA), Indirect Feedback Alignment (IFA), Hebbian learning, and the like, are used to update the model parameters in such a manner as to minimize this objective function. This cycle is repeated until the minimum of the objective function is reached.

The trainer also performs the process of selecting hyperparameters, using an optimization algorithm, to find the model parameters that correspond to the best fit between prediction and actual outputs. Example optimization algorithms include a stochastic gradient descent algorithm or a variant thereof such as batch gradient descent or minibatch gradient descent. The hyperparameters are settings that can be tuned or optimized to control the behavior of the machine learning algorithms. Most models explicitly define hyperparameters that control different aspects of the models such as memory or cost of execution. However, additional hyperparameters may be defined to adapt a model to a specific scenario. For example, the hyperparameters may include the number of hidden units of a model, the learning rate of a model, the convolution kernel width, the number of kernels for a model, the number of graph connections to make during a lookback period, the maximum depth of a tree in a random forest, a minimum sample split, a maximum number of leaf nodes, a minimum number of leaf nodes, and the like.

Once a set of model parameters are identified, the model has been trained and is then validated using the validation datasets by the validator. The validation process includes iterative operations of inputting the validating datasets into the machine learning algorithms using a validation technique such as K-Fold Cross-Validation, Leave-one-out Cross-Validation, Leave-one-group-out Cross-Validation, Nested Cross-Validation, or the like to fine tune the hyperparameters and ultimately find the optimal set of hyperparameters. Once the optimal set of hyperparameters are obtained, a reserved set of testing data (testing dataset 108), from the initial splitting of the labeled data 102, are input into trained model 106 to obtain output (in this example, predicted classes from the NER, RE and AD tasks), and the output is evaluated versus ground truth values (e.g., the labels) using correlation techniques such as Bland-Altman method and the Spearman's rank correlation coefficients and calculating performance metrics such as the error, accuracy, precision, recall, receiver operating characteristic curve (ROC), etc.

The model training subsystem 112 outputs a trained model 106 with an optimized set of model parameters and hyperparameters for use in the model inference subsystem 114. The model inference subsystem 114 generates inference phase predictions 116 from new data 120 (e.g., unlabeled data not seen before by the model) using a preprocessor and predictor and the trained model 106. For example, the preprocessor and predictor execute processes for inputting new data 120 (e.g., text from EHRs) into a trained model 106. Then the trained model 106 will perform the NER, RE and AD tasks and output predictions 116 (e.g., classes for entities, relations, and assertions). The preprocessor and predictor are part of the machine learning operationalization framework comprising hardware such as one or more processors (e.g., a CPU, GPU, TPU, FPGA, the like, or any combination thereof), memory, and storage that operates software or computer program instructions (e.g., Application Programming Interfaces (APIs), Cloud Infrastructure, Kubernetes, Docker, TensorFlow, Kuberflow, Torchserve, and the like) to execute arithmetic, logic, input and output commands for executing a machine learning model in a production environment. In some instances, the trainer, validator, preprocessor, predictor, or any combination thereof are implemented using a cloud platform such as Oracle Cloud Infrastructure providing one or more services via Infrastructure as a Service (IaaS) as described in further detail herein. A cloud platform makes machine learning more accessible, flexible, and cost-effective while allowing developers to build and deploy the model faster.

B. Particular Problem Description

Figure 2:
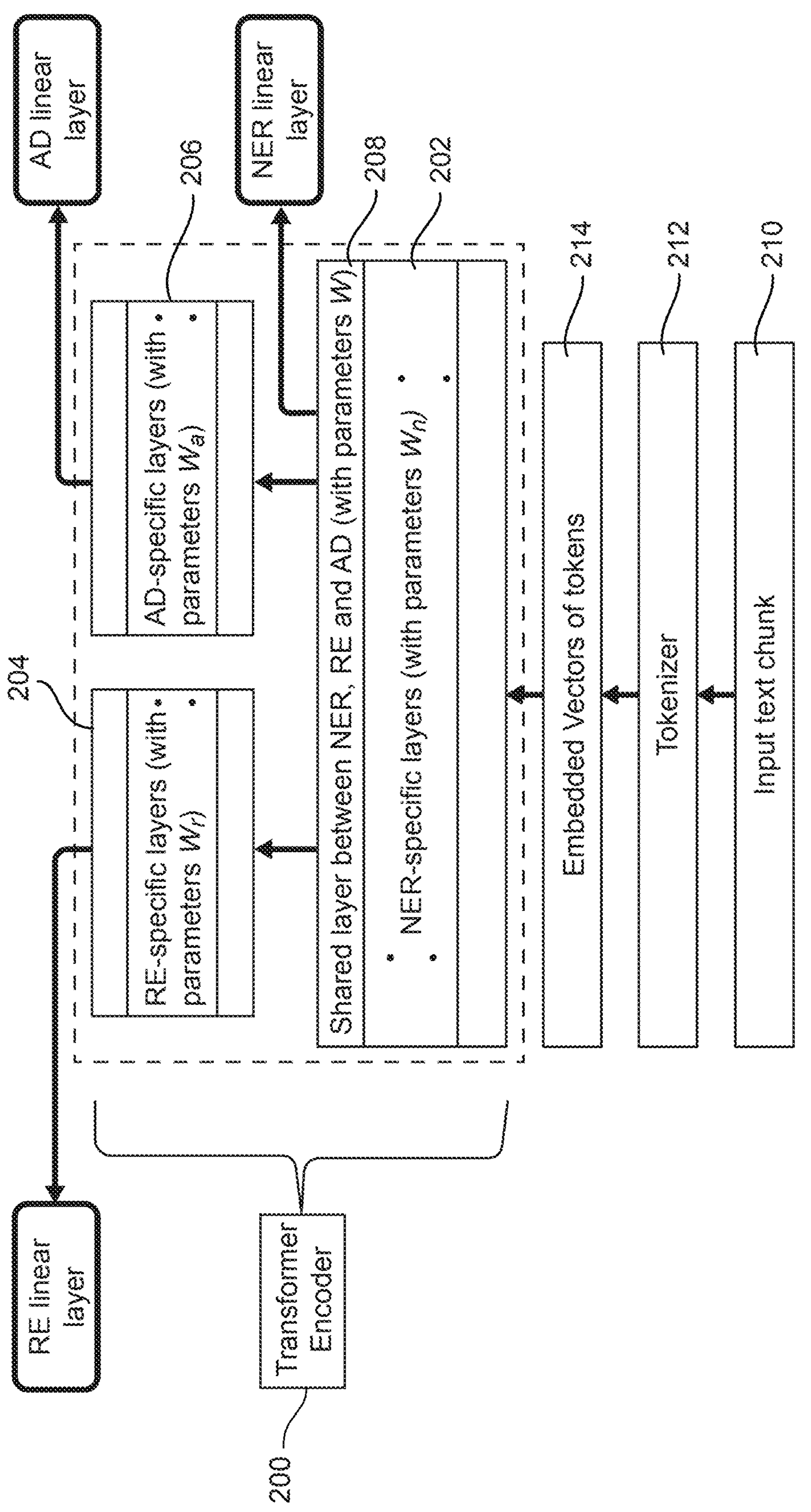
FIG. 2 shows an architecture for the shared layer machine learning model in accordance with various embodiments.

The problem at hand is to learn from multiple tasks simultaneously by layers of a machine learning model (e.g., a pre-trained language with a transformer architecture) that are shared between tasks. The multi-task learning framework 100 deals with combined learning of three NLP tasks—NER, RE and AD, which are denoted herein using subscripts 'n', 'r' and 'a' respectively. In some instances, a pretrained language model with a transformer architecture such as a Bidirectional Encoder Representations from Transformers (BERT) model with multiple layer (e.g., 12 layers) configured for the combined learning of tasks. In some instances, the first six layers of the transformer are to be used to train NER tasks, the next four layers are used for RE and a copy of these four layers are used for AD (span-based predictions may be used for all the tasks). The total number of layers used for each task can be varied to generate an optimum performance of the model for combined learning. An example of an architecture of the model is shown in FIG. 2 and described herein in detail.

C. Input Data Preparation

The text used to train a model to according to various embodiments of the multi-task learning framework 100 may be one or more documents. The one or more documents can be represented as a sequence of words $D=\{w_1, w_2, \ldots, w_n\}$, from which can be constructed a set of all possible within-sentence word sequence spans $S_D=\{s_1, s_2, \ldots, s_N\}$. The span length can vary from, for example, one word, to a pair of words, to a longer sequence of words (up to a reasonable length (i.e., no greater than 6 words or tokens). In the training setup, multiple structures may be configured to facilitate the combined learning of multiple tasks. In some instances, three structure are used for the setup—the set E of entity types, the set R of relations, and the set L of assertion modalities.

The text in a document used as input data to the transformer model can be pre-processed by annotating (labelling) the text. In at least some examples, data labelling may be performed by a human annotator. Labelling of the text can add context or meaning or can be used to otherwise augment the text in a manner that makes the resulting input data more understandable to the transformer model or could be used to provide ground truth information for evaluation of performance and updating of parameters. For example, as discussed with respect to FIG. 1, labelling the data may include adding different entity markers to the text, identifying relations between the marked entities, and identifying the assertion class for a given span or entity. The entity markers may be used to indicate different entity types. In some examples, the entity types may be medical-related entity types. For example, the entity types may include biomedical information, personal identifying information (PII), personal health information (PHI), and combinations thereof. Biomedical entity types may include, without limitation, classifications such as medicine name, medicine dosage, medicine frequency, diagnosis, etc. Relations between entities may also be annotated. For example, an identified relation between a "patient" entity type and a "drug" entity type present within textual data may indicate to the model that the patient was "advised" to take the drug. The textual data may be further annotated to identify the assertion class of the various identified entities. Assertion modifiers may belong to various categories, such as certainty, conditionality, association, or temporal categories. Different assertion values may exist within each assertion category. For example, within the certainty assertion category, an entity may have a "positive" value, a "negative" value, or some other "possible" value. Annotating the text supplied as input to the model during training can allow the trained model to properly predict entities, relations, and assertions when applied to unlabeled text.

D. Neural Network-Based Model

One example of a machine learning model 200 that is suitable for combined task learning according to various embodiments is illustrated in FIG. 2. As shown, the machine learning model 200 may be a neural network, such as a multi-layer transformer encoder model. In some instances, the machine learning model 200 is a BERT model, which is pre-trained for natural language processing. In some instances, the BERT model is finetuned during training for multiple natural language processing tasks including NER, RE and AD tasks.

As shown in FIG. 2, the machine learning model 200 includes twelve layers for the combined learning of the NER, RE, and AD tasks, but other model variations having a different number of total layers may also be possible to produce optimum performance of the model 200 during multi-task learning. In the particular embodiment shown in FIG. 2, the first six layers of the model 200 are NER-specific layers that collectively form a NER module 202 that can be used to train the model 200 on the NER task. The last four layers of the model 200 can form a RE module 204 that may be used to train the model 200 on the RE task, while a copy of the last four layers of the model 200 can form an AD module 206 used that may be used to train the model 200 on the AD task. A shared layer 208 may be interposed between the model layers forming the NER module 202 and the model layers forming the RE module 204 and the AD module 206.

As further illustrated in FIG. 2, a textual input to the model 200 may be provided in the form of a text chunk 210 via text chunking. Text chunking, also known as shallow parsing, involves dividing a text into syntactically meaningful chunks, typically phrases or constituents. This process helps in identifying and extracting important information from sentences. The text chunk 210 may simply be a smaller text segment of the overall text appearing in a document having some sequence of words and used to provide input data for the model 200. Text chunking can be beneficial to the model training process. For example, chunking may result in a more accurate summarization of the document text by focusing on smaller text sections rather than the overall document and can result in improved entity analysis, identification and classification, among other things. Various text chunking techniques may be employed such as noun-phrase chunking, verb phrase chunking, prepositional phrase chunking, named entity chunking, rule-based chunking, and the like.

In the example of FIG. 2, the text chunk 210 is input to a tokenizer 212, which may operate to split the text chunk 210 (e.g., paragraphs or sentences) into even smaller segments (tokens), such as individual words, sentences, sub-words, or characters (e.g., morphemes or character n-grams), for better understanding by the model 200. The tokenizer 212 may perform the tokenization process on a word level, a sentence level, a sub-word level, a character level, etc. Once a text is tokenized, the resulting tokens can be grouped together to create spans based on the specific requirements of the task or analysis. For example, in NER, tokens corresponding to an entity (such as a person's name or a location) can be combined to form a span representing that named entity. Similarly, in text chunking or syntactic analysis, tokens associated with a specific phrase or constituent can be grouped into a span. The textual tokens generated by the tokenizer 212 may then be subjected to vector transformation 214 to produce embedded vectors of the tokens that can serve as input to the NER module 202 of the model 200. Embedded vectors of tokens refer to numerical representations of individual tokens obtained through embedding techniques in natural language processing. Token embeddings are dense vector representations that capture semantic relationships and contextual information of words or subword units within a given text. These vectors are learned during the training and use of embedding models.

E. Model Training and Inference Techniques

As described in detail with respect to FIG. 1, the trainer performs iterative operations of training that involve inputting portions of the data into machine learning algorithms to find a set of model parameters (e.g., weights and/or biases) that minimize objective functions (e.g., loss/error function, cost function, modified cross entropy loss, etc.).

In the case of the NER task, the likelihood of the entity type e assuming the value of the golden entity type e* (ground truth label) for a text span s within a set of spans $S_D$ of a document D (i.e., $s \in S_D$) may be computed according to Equation (1):

$$L_n = \sum_{D} \sum_{\{s \in S_D\}} \sum_{\{e^* \in E\}} \log p(e = e^* \mid s, D) \qquad \text{Equation (1)}$$

where $L_n$ is the loss for NER and $D=\{w_1, w_2, \ldots, w_n\}$.

In the case of the RE task, the likelihood of the relation r being equal to the golden relation r* (ground truth label) given a pair of mapped text spans $(s_1, s_2)$ within a document D may be computed according to Equation (2):

$$L_r = \sum_{D} \sum_{\{(s_1, s_2) \in S_D \times S_D\}} \sum_{\{r^* \in R\}} \log p(r = r^* \mid (s_1, s_2), D) \qquad \text{Equation (2)}$$

where $L_r$ is the loss for RE and $D=\{w_1, w_2, \ldots, w_n\}$.

In the case of the AD task, the likelihood of the modality qualifier (class) $l_i$ taking the value of the golden modality qualifier $l_i^*$, $1 \le i \le |L|$ given a text span $s \in S_D$ whose mapped entity type is being qualified by the assertion modality in a document D may be computed according to Equation (3):

$$L_a = \sum_{D} \sum_{\{s \in S_D\}} \sum_{\{l_1^* \in L \wedge l_2^* \in L \wedge \ldots \wedge l_{\{|L|\}}^*\}} \log p(l_1 = l_1^* \wedge l_2 = l_2^* \wedge \ldots \wedge l_{\{|L|\}}^*) | s, e, D) \qquad \text{Equation (3)}$$

where $L_a$ is the loss for AD and $D=\{w_1, w_2, \ldots, w_n\}$.

In each of the above three NER, RE, and AD instances, corresponding loss functions can be modified by considering a null entity type $\in$, a null relationship $\phi$, and a null assertion qualifier $\psi$, respectively and appropriately. Using an additive loss function approach, the total loss may be computed according to Equation (4):

$$L_{\{total\}} = \sum_{\{i=n,r,e\}} v_i L_i(\cdot), \qquad \text{Equation (4)}$$

where the loss functions $L_i(\cdot)$, $\forall i$ (Equations (1)-(3) are summed over all tasks, and $v_i$ is the coefficient of the individual loss functions, which may depend on the iteration step t.

In multi-task learning, it may be possible to balance the training by manipulating the forward pass of the network. However, such techniques suffer from a drawback where task imbalance manifests as imbalances between back propagated gradients leading to improper training. More specifically, during training, a task that is dominant, will demand for gradients with large magnitude, which will force a higher contribution in the loss function and improper training. To address this challenge and others, the trainer and loss functions are configured to find the best value for each loss coefficient $v_i$, for each training step t so that the contribution (for the task) balances out. The weight $v_i(t)$ is optimized for each time step t for balancing the gradients, which is based on a concept that penalizes the network when back propagated gradients from any task are too large or too small. To implement this type of training, two approaches are described herein. In the first approach (partial pipelined shown in FIG. 3), the NER task is trained on the NER task dedicated layers till convergence, followed by training both the RE and AD tasks simultaneously. In the second approach (multi-task training shown in FIG. 4), NER, RE, and AD tasks are trained jointly in which the gradient is balanced for optimal model training.

E.1. Partial Pipelined Model Training Approach

A partial pipelined model training approach includes multiple phases within which the model is trained on the NER, RE, and AD tasks. An overview of one example of a process flow 300 for training a machine learning model to perform NER, RE, and AD tasks using a partial pipelined approach is illustrated in FIG. 3.

E.1.1. Phase 1

Figure 3:
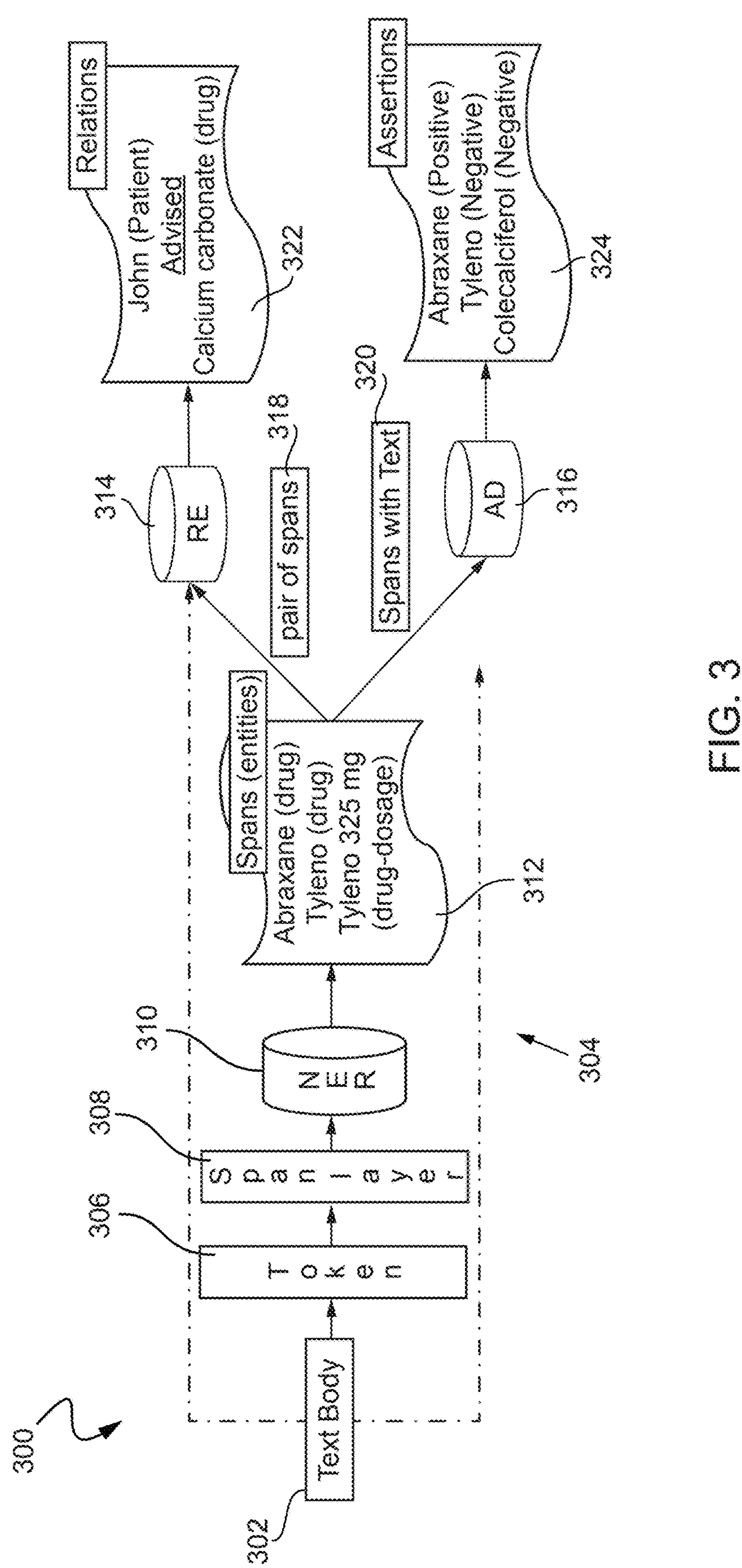
FIG. 3 illustrates a partial pipelined based approach for training a machine learning model in accordance with various embodiments.

Referring to FIG. 3, text 302, which may be a chunk of text from a document, the entirety text of a document, etc., is provided as input to a multi-layer model 304, which may again be, but is not limited to, a BERT model. The model 304 may have, but is not required to have, the same construction as the model 200 described with respect to FIG. 2. The NER task is trained using a NER module 310 comprising a first number of layers of the model 304, such as the first eight layers of twelve total layers. The model parameters associated with the NER layers of the NER module 310 may be denoted as $W_n$.

As shown, prior to being delivered to the NER module 310, the text 302 may be provided to a tokenizer 306, which may separate the text 302 into tokens in the form of individual words, sub-words, characters, etc. In some embodiments, a token-based prediction approach may be employed, whereby the tokens may be subjected to vector transformation to produce numerical representations of the tokens that can serve as input to the NER module 310. Additionally, or alternatively, and as shown in FIG. 3, the partial pipelined model training approach may utilize span-based prediction for the NER task, and also for the RE and AD tasks. To this end, the tokens generated by the tokenizer 306 may be organized as a plurality of spans 308 for use in training the model 304 on the NER task. The spans 308 may be contiguous spans of tokens generated by the tokenizer 306, and thus may be, for example, contiguous segments of text, such as individual words or sequences of words. When a span 308 of the plurality of spans 308 is a sequence of words, there may be a reasonable limit placed on the allowable length of the span (i.e., no greater than 20 words or tokens). Specialized markers or tags may be used to, for example, indicate the start or end of a given span, or for span categorization. The process of organizing the tokenized text into spans may be performed by a human annotator or may be an automated process (e.g., rule or ML based).

The spans 308 may serve as the input for NER training. In FIG. 3, the spans 308 may be input to the NER module 310, which may subject the spans to various NER training techniques by which entities present in the text can be identified and classified/categorized. Spans may also be mapped to entity types, and the spans can be encoded with the entity type information. In the example of FIG. 3, the text 302 is medical-related text, such as a doctor-patient conversation summary, which may be in the form of a clinician's subjective, objective, assessment and plan (SOAP) notes, an EMR/EHR document, a patient discharge summary, or another summary of a conversation associated with a doctor-patient interaction. As such, the output 312 of the NER module 310 may be a plurality of identified and categorized medical entities organized as spans.

As an example, during NER training according to FIG. 3, the sentence "Continue Abraxane, patient is not taking Tyleno 325 mg and he is advised calcium carbonate. Patient also stopped colecalciferol 1,000 units PO." obtained from a summary of a conversation between a doctor and a patient named "John" is provided as textual input to the model 304 after being tokenized and organized into spans in the manner previously described. The NER module 310 is shown in FIG. 3 to have resultantly identified the entity "Abraxane" and to have correctly classified the "Abraxane" entity as a "drug." Similarly, the text "Tyleno" has been identified as an entity and has been correctly classified as a "drug." It can also be observed that the multi-token span "Tyleno 325 mg" has been identified and classified as "drug-dosage." The NER module 310 may also identify and classify "calcium carbonate" and "colecalciferol" as drug entities. A multitude of other identified entities and associated classifications may result from training the NER module 310 on the NER task.

E.1.2. Phase 2

Entity types identified within the various text spans of the textual input data may be output 312 from the NER module 310 and used as input to each of a RE module 314 and an AD module 316 of the model 304 for simultaneous training of the RE and AD tasks, as is described in more detail below.

In one example of a second phase (Phase 2) of the partial pipelined model training approach, $W \subseteq W_n$ may be assumed to be the parameters in the last layer of the eight layers of the model 304 that are dedicated to the NER module 310 and training of the NER task. These parameters can be shared with the model layers forming the RE module 314 and the AD module 316 for respectively training the model 304 to perform the RE and AD tasks, with parameters $W_n$ reserved for the layers of the RE module 314 and parameters $W_a$ reserved for the layers of the AD module 316. The embodiment of the model 304 of FIG. 3 may again utilize two copies of the last four layers of the model 304 for the RE module 314 and the AD module 316, but other model configurations may be used in other embodiments. The model 304 can be simultaneously trained on the RE and AD tasks while back propagating the loss up to a shared layer (with parameters W), such as on a regularizer that is specific to the shared layer and can help to prevent overfitting and improve generalization performance.

As may be observed in FIG. 3, and as described above, training the NER module 310 of the model 304 on the NER task using the input text with span information results in the detection of spans with entities within the text, which is the ouput 312 of the NER module 310. The ouput 312 of the NER module can be simultaneously provided as input to both the RE module 314 and the AD module 316. In the case of the RE module 314, the output from the NER module 310 is received as input in the form of pairs of spans with entity type information 318. In the case of the AD module 316, the output 312 from the NER module 310 is received as input in the form of spans with mapped (labeled) entities 320. The RE module 314 and the AD module are then concurrently trained on the input data 318, 320 received from the NER module 310.

During simultaneous training of the RE and AD tasks, the RE module 314 performs a relation extraction operation by which the RE module 314 predicts the relation type between the received pairs of spans 318, or predicts a null relation when it is determined that there is no relation between a given received pair of spans. As one example, it is shown in FIG. 3 that the RE module 314 received from the NER module 310 a pair of spans from the above-described sentence of the doctor-patient conversation summary wherein "John" is identified as an entity and is classified as a "Patient" and where "calcium carbonate" is identified as an entity and is classified as a "Drug." As is also shown, the RE training process results in a prediction by the RE module 314 that the relation between the patient John and the drug calcium carbonate is "Advised." That is, output 322 of the RE module 314 relative to this pair of spans is a prediction that the patient John was "advised" by the doctor to to take the drug calcium carbonate.

During simultaneous training of the RE and AD tasks, the AD module 316 performs an assertion detection operation by which the AD module 316 predicts the assertion and the assertion class for each of the spans with mapped (labeled) entities 320 received from the NER module 310. The NER module 310 may be trained to predict various different assertion classes. In the case of the model 304 of FIG. 3, however, the possible assertion classes are limited to "positive" or "negative." As one example of assertion detection, it is shown in FIG. 3 that the AD module 316 received from the NER module 310 spans from the above-described sentence of the doctor-patient conversation summary within which "Abraxane," "Tyleno" and "colecalciferol" have been identified as entities. As is also shown, the AD training process results in a prediction (output 324) by the AD module 316 that the assertion class associated with the "Abraxane" entity is "Positive," and that the assertion classes associated with each of the "Tyleno" and "colecalciferol" entities is "Negative." A review of the sentence from which the "Abraxane," "Tyleno" and "colecalciferol" entities were extracted confirms that the assertion classes predicted by the AD module 316 are correct, as the patient (John) was advised by the doctor to continue taking Abraxane, the patient is not taking Tylenol, and the patient has stopped taking colecalciferol.

E.1.3 Loss Function

In the partial pipelined model training approach, an attempt is made to optimize the loss function of each task. Thus, as is explained in more detail below, the total loss function for the model is the sum of the optimized loss functions associated with each of the NER, RE, and AD tasks. In this regard, the loss function associated with training of the NER task can be maximized until convergence, and may be computed according to Equation (6):

$$\max_{\{W_n\}} L_n(W_n) \qquad \text{Equation (6)}$$

where $L_n$ is the loss for NER as computed according to Equation (1) and $W_n$ is the model parameters associated with the NER layers.

Once the NER module 310 is trained, the parameters $W \subseteq W_n$ in the topmost layers (e.g., among the eight layers) are used to process input to be shared for training both the RE and AD modules 314; 316 (e.g., duplicate copied of the last four layers) in parallel (with parameters $W_r$ reserved for RE layers and parameters $W_a$ reserved for AD layers) while back propagating the loss up to the shared layer (with parameters W), on a regularizer that is specific to the shared layer. Consequently, the total loss function associated with the partial pipelined model training approach may be computed according to Equation (7):

$$L_{\{total\}} = R(W) + v_r(t)[R(W_r) + L_r(W_r, W)] + v_a(t)[R(W_a) + L_a(W_a, W)] \qquad \text{Equation (7)}$$

where $$R(W_i) = \frac{\lambda_i}{2} \sum_{\{w \in W_i\}} \|w\|_2^2,$$

$i \in \{r,a\}$ and where $$\|\cdot\|_2^2$$

denotes the $l_2$-norm of a vector. The same holds true for R(W). The overall loss function may be maximized according to Equation (8) with proper back propagation planned on parameters W, $W_r$, $W_a$:

$$\max_{\{W, W_r, W_a, v_r, v_a\}} L_{\{total\}}(W, W_r, W_a, v_r, v_a) \qquad \text{Equation (8)}$$

In the case of the loss function associated with the partial pipelined model training approach, it is desirable to determine the loss coefficients $v_r(t)$ and $v_a(t)$ for the corresponding RE and AD tasks with the following goals:

- gradient norms for different tasks should be placed on a common scale through which corresponding relative magnitudes may be decided, and
- the gradient norms should be dynamically adjusted so that the tasks can be trained at similar rates.

This approach may be expressed through the following Equations (9) and (10):

$$G_W^i(t) = \|\nabla_W v_i(t) L_i(W_i, W)\|_2,\ i = r, a \qquad \text{Equation (9)}$$

which is the $l_2$-norm of the gradient of the weighted single task loss $v_i(t)L_i(W_i,W)$ with respect to the chosen weights W (appearing in the shared layer); and $$\overline{G_W^i(t)} = E_{\{r,a\}}\left[G_W^i(t)\right] \quad \text{Equation (10)}$$

which is the average gradient norm across the RE and AD tasks at training time t.

The various rates for each task i∈{r,a} may be expressed as:

$$\overline{L}_i(t) = L_i(t)/L_i(0); \quad \text{Equation (11)}$$

and the relative inverse training rate of task i∈{r,a} may be expressed as:

$$r_i(t) = \frac{\overline{L}_i(t)}{E_{\{r,a\}}\left[\overline{L}_i(t)\right]}, \quad \text{Equation (12)}$$

where $E_{\{r,a\}}[\overline{L_i}(t)]$ is the mean loss rate over task i=r,a.

Update rules for each of the RE and AD tasks may be set up as follows (with the assumption of maximizing the relevant loss function):

$$v_j(t+1) = v_j(t) + r\nabla_{\{v_j\}} L_{\{grad\}},\ j \in \{r, a\}; \quad \text{Equation (13)}$$

$$W(t+1) = W(t) + \beta\nabla_W L_{\{total\}}; \quad \text{Equation (14)}$$

$$W_r(t+1) = W_r(t) + \beta_r\nabla_{W_r}[R(W_r) + L_r(W_r)]; \quad \text{Equation (15)}$$

$$W_a(t+1) = W_a(t) + \beta_a\nabla_{W_a}[R(W_a) + L_a(W_a)]. \quad \text{Equation (16)}$$

where γ, β, $\beta_r$, $\beta_a$ denote the respective step sizes. Furthermore:

$$L_{\{grad\}} = \sum\nolimits_{\{i=r,a\}} \left| G_W^i(t) - \overline{G_W^l(t)} \times [r_i(t)]^{\{\alpha\}} \right|_1, \quad \text{Equation (17)}$$

where $|\cdot|_1$ denotes the $l_1$-norm of a vector, and a is an additional hyperparameter which is responsible for bringing the tasks back to a common training rate. The value of a may depend on the differences between the nature of the tasks. For example, if the tasks are very different, there may be a substantial difference between the learning dynamics associated with each task. In such a case, the value of the hyperparameter a may be set higher to encourage better balancing of the task training rates. Likewise, a lower value of the hyperparameter a may be advisable when the tasks are more symmetric in nature.

E.1.4 Sample Phase 2 Training Routine

Various steps associated with one example of a routine for training a model on the RE and AD tasks may be expressed as follows:

Initialize $v_i(0) = 0$ for i = r, a

Pick values for as α > 0, β > 0, $\beta_r$ > 0, $\beta_a$ > 0 and γ > 0

Initialize values for parameters $W_r$, $W_a$

Assign the values for parameters W from the output of Phase 1 for t = 0 to max_train_steps do

Input batch $X_i$ to compute $L_i(t)$, i = {r, a}

$L_{\{total\}}(t) = R(t, W) + v_r(t)[R(t, W_r) + L_r(t, W_r, W)] + v_a(t)[R(t, W_a) + L_a(t, W_a, W)]$ (standard forward pass) (R(t, W) is overloaded with an additional parameter t that allows the former to be specified at the iteration step t).

Compute $G_W^{\{i\}}$ and $r_i(t)$ for $i \in \{r, a\}$

Compute $\overline{G_W^t(t)}$ by averaging $G_W^{\{i\}}$, and also choosing an appropriate value of of α

Compute $L_{\{grad\}} = \sum\nolimits_{\{i=n,r\}} \left| G_W^i(t) - \overline{G_W^t(t)} \times [r_i(t)]^{\{\alpha\}} \right|_1$ Compute $\nabla_{\{v_i\}} L_{\{grad\}}$, keeping targets $\overline{G_w^t(t)} \times [r_i(t)]^{\{\alpha\}}$ constant Compute $\nabla_{\{w_r\}} L_{\{total\}}$ and $\nabla_{\{W_r\}} L_{\{total\}}$, which are the standard gradients Update $v_j(t) \mapsto v_j(t+1)$, j ∈ {r, a}, using the above-described update rules Update $W_r(t) \mapsto W_r(t+1)$; $W_a(t) \mapsto W_a(t+1)$ (standard backward pass), using the above-described update rules Renormalize $v_j(t+1)$, so that $\Sigma_{\{j=r,a\}} v_j(t+1) = 2$ end for

E.1.5. Model Inference

During inference the input text is endowed with span information in a like or similar manner to that described above with respect to the Phase 1 NER training. The text with span information is provided as input to the NER module 310, which results in the detections of spans with entities 312 within the text. Ouput from the NER module 310 is simultaneously provided as input to both the RE module 314 and the AD module 316. In the case of the RE module 314, the output from the NER module 310 is received as input in the form of pairs of spans with entity type information 318. In the case of the AD module 316, the output from the NER module 310 is received as input in the form of spans with mapped (labeled) entities 320. The RE module 314 and the AD module then concurrently process the received input data. Particularly, the RE module 314 performs a relation extration operation by which the RE module 314 predicts the relation type between the received pairs of spans, or predicts a null relation when it is determined that there is no relation between the spans. Simultaneously, the AD module 316 predicts the assertion and the assertion classes for each of the mapped spans received from the NER module 310.

E.2. Concurrent Learning Model Training Approach

A concurrent learning model training approach may alternatively be utilized, wherein a model is concurrently trained on all of the NER, RE, and AD tasks. An overview of one example of a process flow 400 for training a machine learning model to perform NER, RE, and AD tasks using a concurrent learning model training approach is illustrated in FIG. 4.

Figure 4:
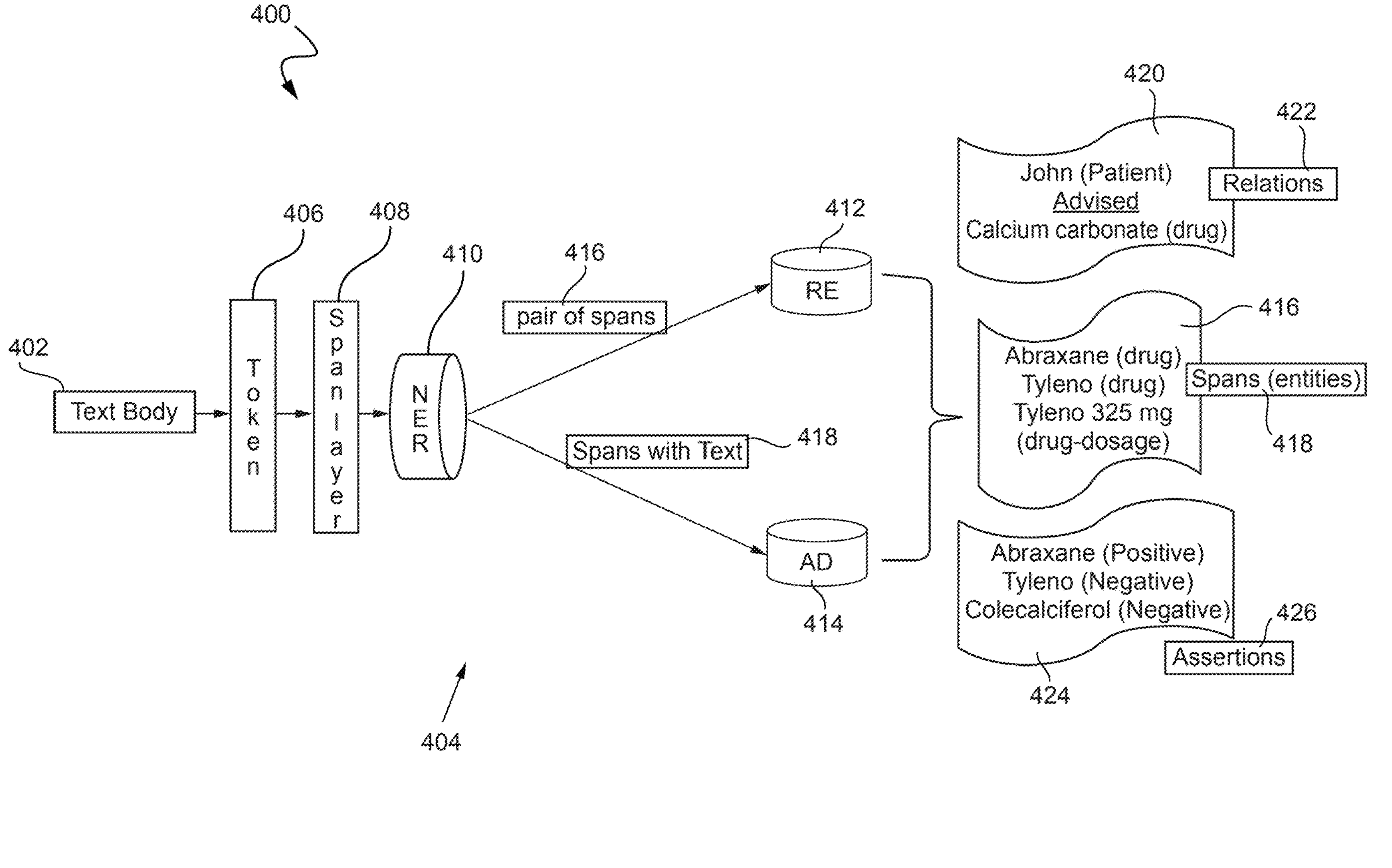
FIG. 4 illustrates a a multi-task training approach for training a machine learning model in accordance with various embodiments.

Referring to FIG. 4, text 402, which may be a chunk of text from a document, the entirety text of a document, etc., may be provided as input to a multi-layer model 404, which may again be, but is not limited to, a BERT model. The model 404 may have, but is not required to have, the same construction as the model 202 of FIG. 2. The NER task is trained using a NER module 410 comprising a first number of layers of the model 404, such as the first eight layers of twelve total layers. At least some of the parameters associated with the NER layers of the NER module 410 of the model 404 are shared with a RE module 412 and an AD module 414 of the model 404, and the associated parameters may be denoted as $W_n$.

As shown, prior to being delivered to the NER module 410, the text 402 may again be provided to a tokenizer 406, which may separate the text 402 into tokens in the form of individual words, sub-words, characters, etc. In some embodiments, a token-based prediction approach may be employed, whereby the tokens may be subjected to vector transformation to produce numerical representations of the tokens that can serve as input to the NER module 410. Additionally, or alternatively, and as shown in FIG. 4, the concurrent learning model training approach may utilize span-based prediction for the NER task, and also for the RE and AD tasks. To this end, the tokens generated by the tokenizer 406 may be organized as a plurality of spans 408 for use in training the model 404 on the NER task. The spans 408 may be contiguous spans of tokens generated by the tokenizer 406, and thus may be, for example, contiguous segments of text, such as individual words or sequences of words. When a span of the plurality of spans 408 is a sequence of words, there may be a reasonable limit placed on the allowable length of the span (i.e., no greater than 20 words or tokens). Specialized markers or tags may be used to, for example, indicate the start or end of a given span, or for span categorization. The process of organizing the tokenized text into spans may be performed by a human annotator or may be an automated process (e.g., rule or ML based).

The spans 408 may serve as the input for NER training. In FIG. 4, the spans 408 may be input to the NER module 410 for the purpose of identification and classification. Spans may also be mapped to entity types, and the spans can be encoded with the entity type information. In the example of FIG. 4, the text 402 is again medical-related text, such as a doctor-patient conversation summary, which may be in the form of a clinician's subjective, objective, assessment and plan (SOAP) notes, an EMR/EHR document, a patient discharge summary, or another summary of a conversation associated with a doctor-patient interaction. As such, the output 412 of the NER module 410 may be a plurality of identified and classified medical entities organized as spans. The ouput of the NER module can be simultaneously provided as input to both the RE module 412 and the AD module 414. The output from the NER module 410 to the RE module 412 may again be in the form of pairs of spans with entity type information 416. The output from the NER module 410 to the AD module 414 may again be spans with mapped (labeled) entities 418.

According to the concurrent learning model training approach, and as illustrated in FIG. 4, NER training is not conducted prior to RE and AD training like it was in the case of the partial pipelined model training approach. Instead, the spans with entities output of the NER module 410 is provided to the RE module 412 and the AD module 414, and training of all the NER, RE, and AD tasks is performed concurrently. Likewise, the total loss function associated with the concurrent learning model training approach is the combined loss function associated with the concurrent training of all the NER, RE, and AD tasks, rather than a sum of the individual loss functions associated with each of each of NER, RE, and AD tasks as is the case with respect to the partial pipelined model training approach.

In concurrent learning model training, all the NER, RE, and AD tasks are trained on their respective (dedicated) layers of the corresponding NER, RE, and AD module 410, 412, 414 using the assumption that NER task shares at least a few parameters with the RE and AD tasks. Therefore it may again be assumed that $W \subseteq W_n$ are the parameters in the last layer of the eight layers of the model 404 that are dedicated to the NER module 410 and training of the NER task and that these parameters can be shared with the model layers forming the RE module 414 and the AD module 416 for respectively training the model 404 to perform the RE and AD tasks. Parameters $W_r$ may again be reserved for the layers of the RE module 412 and parameters $W_a$ may again be reserved for the layers of the AD module 414. The embodiment of the model 404 of FIG. 4 may again utilize two copies of the last four layers of the model 404 for the RE module 412 and the AD module 414, but other model configurations may be used in other embodiments. The model 404 can be simultaneously trained on the NER, RE and AD tasks while back propagating the loss up to a shared layer (with parameters W), such as on a regularizer that is specific to the shared layer and can help to prevent overfitting and improve generalization performance.

The concurrent nature of the NER, RE, and AD tasks is illustrated in FIG. 4. In this example, the input text again includes the same "Continue Abraxane, patient is not taking Tyleno 325 mg and he is advised calcium carbonate. Patient also stopped colecalciferol 1,000 units PO." sentence received in the example of FIG. 3. This sentence may again originate, for example, from a summary of a conversation between a doctor and a patient named "John." In any case, the sentence is provided as textual input to the model 404 after being tokenized and organized into spans in the manner previously described. As a result of the model training, the NER module 410 is shown in FIG. 4 to have generated an output 416 comprising a plurality of spans with entities 418. Within the NER module output 416, it may be observed that the NER module 410 has identified the entity "Abraxane" and to have correctly classified the "Abraxane" entity as a "drug." Similarly, the text "Tyleno" has been identified as an entity and has been correctly classified as a "drug." While not expressly shown within the output 416 of the NER module 410, the NER module 410 has also identified and classified "calcium carbonate" and "colecalciferol" as drug entities. A multitude of other identified entities and associated classifications may result from training the NER module 410 on the NER task.

Training of the RE task occurs concurrently with training of the NER and AD tasks according to the concurrent learning model training. During training of the RE task, the RE module 412 performs a relation extraction operation by which the RE module 412 predicts the relation type between entities in the received pairs of spans 416, or predicts a null relation when it is determined that there is no relation between the entities in a given received pair of spans. As one example, it is shown in FIG. 4 that the RE module 412 received from the NER module 410 a pair of spans from the above-described sentence of the doctor-patient conversation summary wherein "John" is identified as an entity and is classified as a "Patient" and where "calcium carbonate" is identified as an entity and is classified as a "Drug." As is also shown, the RE task training process results in an output 420 in the form of a predicted relation 422 between entities in a given pair of spans. In this example, the RE module 412 has predicted that the relation between the patient John and the drug calcium carbonate is "Advised." That is, the output 420 of the RE module 412 relative to this pair of spans is a prediction that the patient John was "advised" by the doctor to to take the drug calcium carbonate.

Training of the AD task occurs concurrently with training of the NER and RE tasks according to the concurrent learning model training. During training of the AD task, the AD module 414 performs an assertion detection operation by which the AD module 414 predicts the assertion class for each of the mapped (labeled) entities 320 within the spans received from the NER module 410. The NER module 410 may be trained to predict various different assertion classes. In the case of the model 404 of FIG. 4, however, the possible assertion classes are limited to "positive" or "negative." As one example of assertion detection, it is shown in FIG. 4 that the AD module received from the NER module 410 spans from the above-described sentence of the doctor-patient conversation summary within which "Abraxane," "Tyleno" and "colecalciferol" have been identified as entities. As is also shown, the AD training process results in an AD module output 424 in the form of a predicted assertion class 426 for each of the "Abraxane," "Tyleno" and "colecalciferol" entities identified in the sentence text. In this example, the predicted assertion class associated with the "Abraxane" entity is "Positive," and predicted the predicted assertion classes associated with each of the "Tyleno" and "colecalciferol" entities are "Negative." A review of the sentence from which the "Abraxane," "Tyleno" and "colecalciferol" entities were extracted confirms that the assertion classes predicted by the AD module 414 are correct, as the patient (John) was advised by the doctor to continue taking Abraxane, the patient is not taking Tylenol, and it is stated that the patient has stopped taking colecalciferol.

E.2.1 Loss Function

As explained in more detail above, the concurrent learning model training approach involves training all the NER, RE, and AD tasks concurrently (simultaneously) on their respective layers (of the corresponding modules 410, 412, 414) using the assumption that the NER task shares at least a few training parameters with the RE task and the AD task. Therefore, W S $W_n$ may denote a subset of parameters used in the last layer dedicated to training of the NER task, and these parameters are shared with layers of the model 404 dedicated to training of the RE and AD tasks. The following loss function may be used in the concurrent learning model training approach:

$$L_{\{total\}} = R(W) + v_n(t)[R(W_n) + L_r(W_n)] + v_r(t)[R(W_r) + L_r(W_r, W)] + v_a(t)[R(W_a) + L_a(W_a, W)] \quad \text{Equation (18)}$$

The loss function may be maximized according to:

$$\max_{\{W_n, W_r, W_a, v_n, v_r, v_a\}} L_{\{total\}}(W_n, W_r, W_a, v_r, v_a), \text{ where } W_n \supseteq W, \quad \text{Equation (19)}$$

where again $$R(W_i) = \frac{\lambda_i}{2} \sum_{\{w \in W_i\}} \|w\|_2^2,$$

i∈{n,r,a}, and $$\|\cdot\|_2^2$$

denotes the $l_2$-norm of a vector.

In the case of the loss function associated with the concurrent learning model training approach, it is desirable to determine the loss coefficients $v_n(t)$, $v_r(t)$ and $v_a(t)$. By determining the loss coefficients $v_n(t)$, $v_r(t)$ and $v_a(t)$, gradient norms for the tasks can be made to follow a common scale through which corresponding relative magnitudes may be decided, and the gradient norms may be dynamically adjusted so that all the NER, RE, and AD tasks can be trained at similar rates. This approach may be expressed through the subsequent equations, where the same notations used with respect to the partial pipelined model training approach may again be followed.

Update rules for each of the NER, RE, and AD tasks may be set up as follows:

$$v_j(t+1) = v_j(t) + \gamma \nabla_{\{v_j\}} L_{\{grad\}},\ j \in \{n, r, a\}; \quad \text{Equation (20)}$$

$$W(t+1) = W(t) + \beta \nabla_W L_{\{total\}}; \quad \text{Equation (21)}$$

$$W_n(t+1) = W_n(t) + \beta_n \nabla_n [R(W_n) + L_n(W_n)]; \quad \text{Equation (22)}$$

$$W_r(t+1) = W_r(t) + \beta_r \nabla_{W_r} [R(W_r) + L_r(W_r)]; \quad \text{Equation (23)}$$

$$W_a(t+1) = W_a(t) + \beta_a \nabla_{W_a} [R(W_a) + L_a(W_a)] \quad \text{Equation (24)}$$

where $\gamma$, $\beta$, $\beta_n$, $\beta_r$, $\beta_a$ denote the step sizes relative to the corresponding tasks.

Furthermore:

$$L_{\{grad\}} = \sum_{\{i=n,r,a\}} \left| G_W^i(t) - \overline{G_W^i(t)} \times [r_i(t)]^{\{\alpha\}} \right|_1, \quad \text{Equation (25)}$$

where $|\cdot|_1$ denotes the $l_1$-norm of a vector, and $\alpha$ again represents an additional hyperparameter that is responsible for bringing the tasks back to a common training rate. The value of a may again depend on the differences between the nature of the tasks. For example, if the tasks are very different, there may be a substantial difference between the learning dynamics associated with each task. In such a case, the value of the hyperparameter a may be set higher to encourage better balancing of the task training rates. Likewise, a lower value of the hyperparameter a may be advisable when the tasks are more symmetric in nature.

E.2.2 Sample Model Training Routine

Various steps associated with one example of a routine for training a model on the NER, RE, and AD tasks according to a concurrent learning model training approach may be expressed as follows:

Initialize $v_i(0) = 0$ for i = n, r, a
Pick values for as $\alpha > 0$, $\beta > 0$, $\beta_n > 0$, $\beta_r > 0$, $\beta_a > 0$ and $\gamma > 0$
Initialize values for parameters $W_n$, $W_r$, $W_a$
for t = 0 to max_train_steps do
Input batch $X_i$ to compute $L_i(t)$, i = {n, r, a}
$L_{\{total\}}(t) = v_n(t)\ [R(W_n) + L_r(W_n)] + v_r(t)[\ R(t, W_r) + L_r(t, W_r, W)] + v_a(t)[R(t, W_a) + L_a(t, W_a, W\ )]$ (standard forward pass)
Compute $G_W^{\{i\}}$ and $r_i(t)$ for $i \in \{n, r, a\}$ -continued Compute $\overline{G_W^t(t)}$ by averaging $G_W^{\{i\}}$ Compute $L_{\{grad\}} = \sum_{\{i=n,r,a\}} \left| G_W^i(t) - \overline{G_W^t(t)} \times [r_i(t)]^{\{\alpha\}} \right|_1$ Compute $\nabla_{\{v_i\}} L_{\{grad\}}$, keeping targets $\overline{G_w^t(t)} \times [r_i(t)]^{\{\alpha\}}$ constant Compute $\nabla_{\{W_n\}} L_{\{total\}}$, $\nabla_{\{W_r\}} L_{\{total\}}$ and $\nabla_{\{W_a\}} L_{\{total\}}$ (the standard gradients)
Update $v_j(t) \mapsto v_j(t+1)$, $j \in \{n, r, a\}$
Update $W_n(t) \mapsto W_n(t+1)$; $W_r(t) \mapsto W_r(t+1)$; $W_a(t) \mapsto W_a(t+1)$ (standard backward pass)
Renormalize $v_j(t+1)$, so that $\Sigma_{\{j=r,a\}} v_j(t+1) = 3$
end for

E.2.3. Model Inference

During inference the input text is endowed with span information in a like or similar manner to that described above. The text with span information is provided as input to the NER module 410, which identifies and classifies entities within spans of the text. Pairs of spans with entity type information 416 are provided to the RE module 412 by the NER module 410, and spans with mapped (labeled) entities 418 are provided to the AD module 414 by the NER module 410. The NER module 410, the RE module 412, and the AD module 414 are then concurrently trained on the NER, RE, and AD tasks, respectively. Particularly, the NER module 410 generates spans with mapped entities, the RE module 412 predicts the relation types between entities in the received pairs of spans, or predicts a null relation when it is determined that there is no relation between entities in given spans, and the AD module 414 predicts the assertion classes for the mapped entities associated with each of the received spans.

Figure 5:
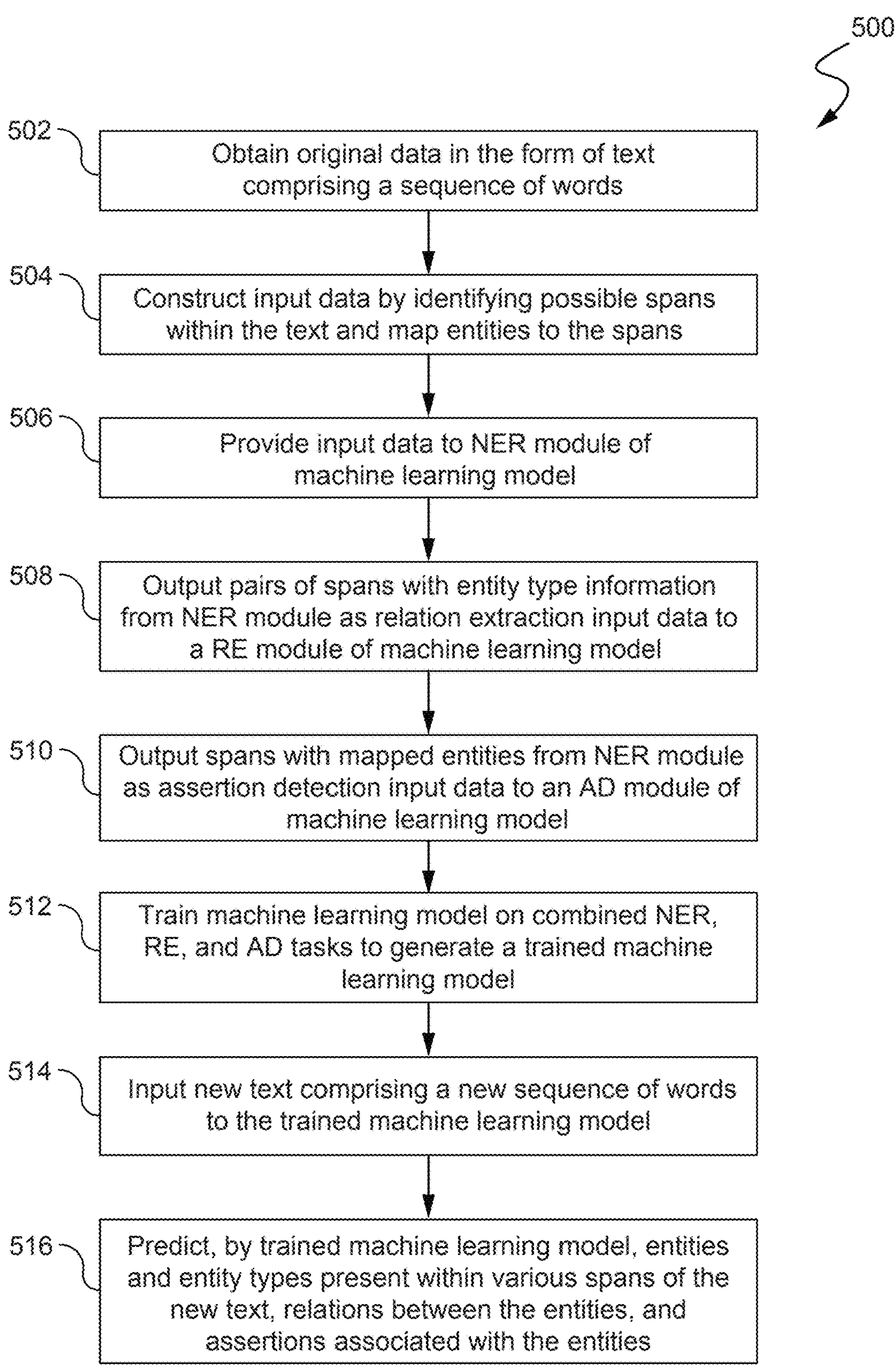
FIG. 5 illustrates a process flow for multi-task learning of named entity recognition, relation extraction, and assertion detection using a shared machine learning model in accordance with various embodiments.

One example of a method 500 for training of a machine learning model is represented in the flowchart of FIG. 5. As indicated at block 502 thereof, original data in the form of text comprising a sequence of words can be obtained for training a machine learning model, such as a transformer model, on multiple NLP tasks. In at least some embodiments, the NLP tasks may be NER, RE, and AD tasks. The text may be provided in the form of a document. The document may be, but is not required to be, a medical-related document containing for example, biomedical information, PII information, PHI information, or combinations thereof. The input text may be tokenized, and is some examples, the tokenized text may be organized into spans.

Input data may next be constructed, as indicated at block 504, by labelling the text. Text labelling may include identifying entities, relations between the entities, and assertion classes associated with the entities. Entity markers may be inserted into the text to identify the location of entities. An entity may be classified as an entity type of a set of available entity types. In some examples, text labelling may be performed by a human annotator with or without the assistance of automated/online annotation tools. In other examples, text labelling may be performed in whole or in part by AI-based annotators.

The input data can then be input to a NER module of a machine learning model, as represented at block 506. In some examples, the NER module may identify possible spans within the text and map the spans to identified entities having different entity types. The machine learning model may be a multi-layer neural network, such as a transformer model. In some examples, the model may be a BERT model. The NER module of the machine learning model may comprise several initial layers of the model. The remaining layers of the model may be dedicated to a RE module and an AD module for respectively learning the RE and AD tasks. A shared layer may reside between a final (top) layer of the NER module and an initial layer of each of the RE module and the AD module. Representations may be shared between the NER module and the RE and AD modules across the shared layer.

As indicated at block 508, the NER module may output as relation extraction input data to a RE module of the machine learning model, pairs of spans with entity type information. As represented in block 510, the NER module may also output as assertion detection input data to an AD module of the machine learning model, spans with mapped entities. The RE module may perform a relation extraction operation on the relation extraction input data by which the RE module can predict the relation type between the entities in the received pairs of spans, or can predict a null relation when it is determined that there is no relation between a given received pair of spans. The AD module may perform an assertion detection operation on the assertion detection input data by which the AD module can predict the assertion and the assertion class for the entities in each of the spans with mapped entities received from the NER module.

The machine learning model can then be trained on combined NER, RE, and AD tasks, as indicated at block 512. More specifically, the machine learning model can be trained to generate a trained machine learning model by training the NER module on the input data, training the RE module on the relation extraction input data, and training the AD module on the assertion detection input data. In one embodiment, training the machine learning model can be performed using a partial pipelined approach. According to a partial pipelined approach, the NER module of the machine learning model is trained on the NER task using the input data in a first training phase, and after training of the NER module on the NER task, the RE module is trained on the RE task using the relation extraction input data while the AD module is simultaneously trained on the AD task using the assertion detection input data in a second training phase. In another embodiment, training the machine learning model can be performed using a concurrent learning approach, whereby training of the NER module of the machine learning model on the NER task using the input data occurs concurrently with training of the RE module on the RE task using the relation extraction input data and training of the AD module on the AD task using the assertion detection input data.

As represented in block 514, new text comprising a new sequence of words can thereafter be input to the trained machine learning model which is provided or deployed for use in an inference phase. The trained machine learning model can predict entities and entity types present within various spans of the new text, as well as relations between the entities, and assertions associated with the entities, as indicated at block 516.

Illustrative Systems

Infrastructure as a service (IaaS) is one particular type of cloud computing that can be used to implement the various techniques described herein. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
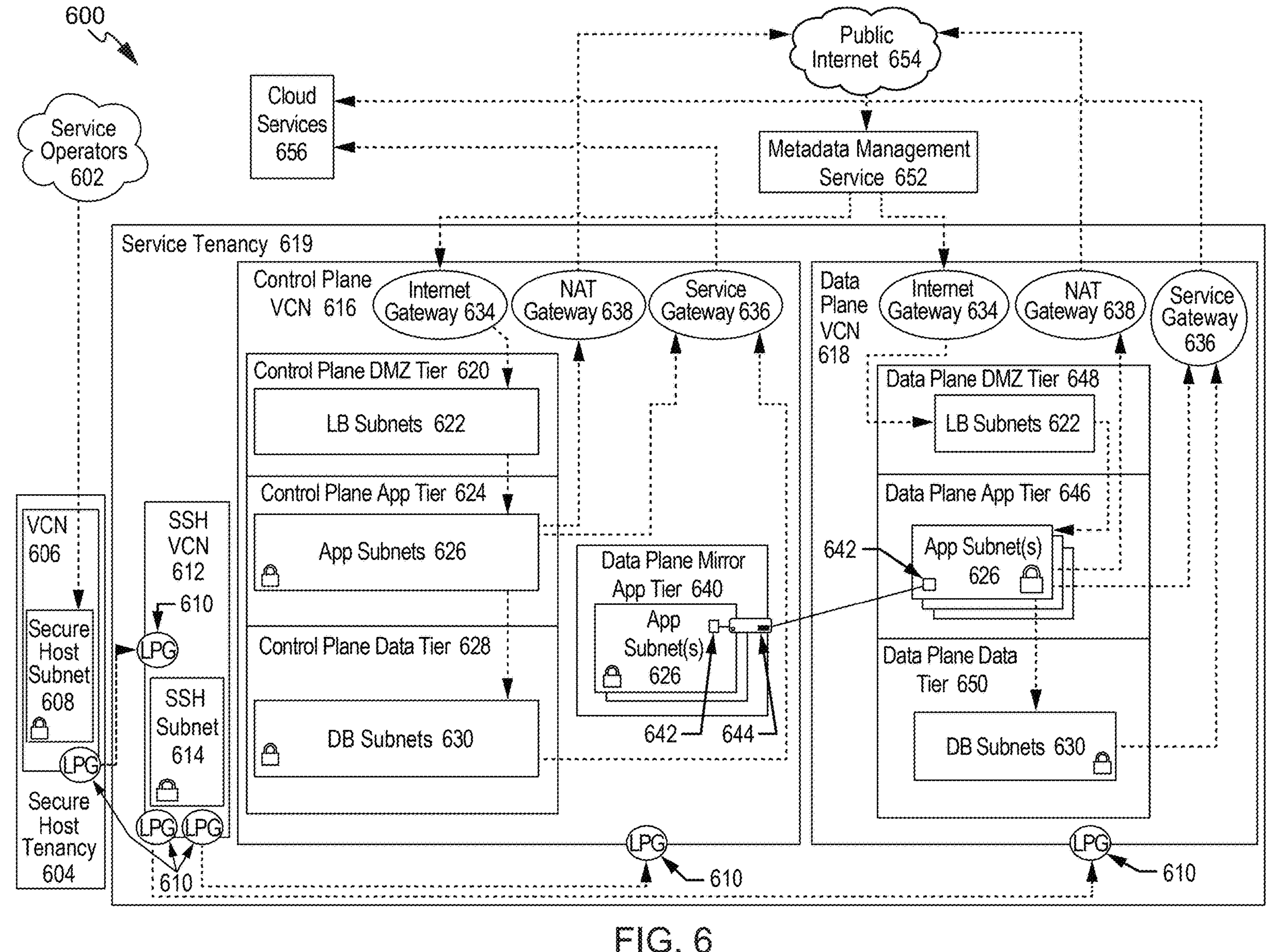
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively coupled to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
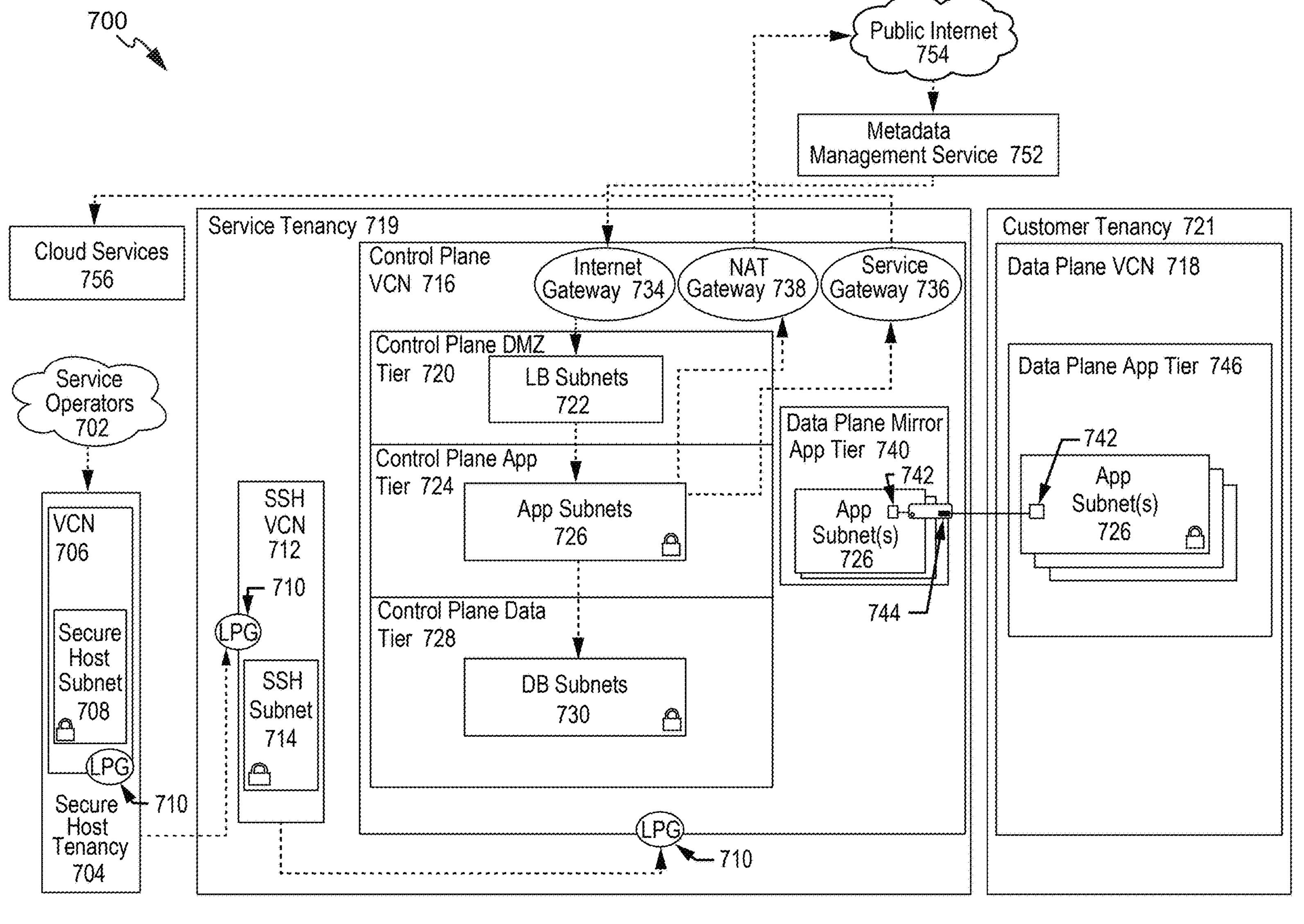
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators

602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively coupled to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 4," may be located in Region 1 and in "Region 2." If a call to Deployment 4 is made by the service gateway 736 contained in the control plane VCN 716 located in Region 1, the call may be transmitted to Deployment 4 in Region 1. In this example, the control plane VCN 716, or Deployment 4 in Region 1, may not be communicatively coupled to, or otherwise in communication with, Deployment 4 in Region 2.

Figure 8:
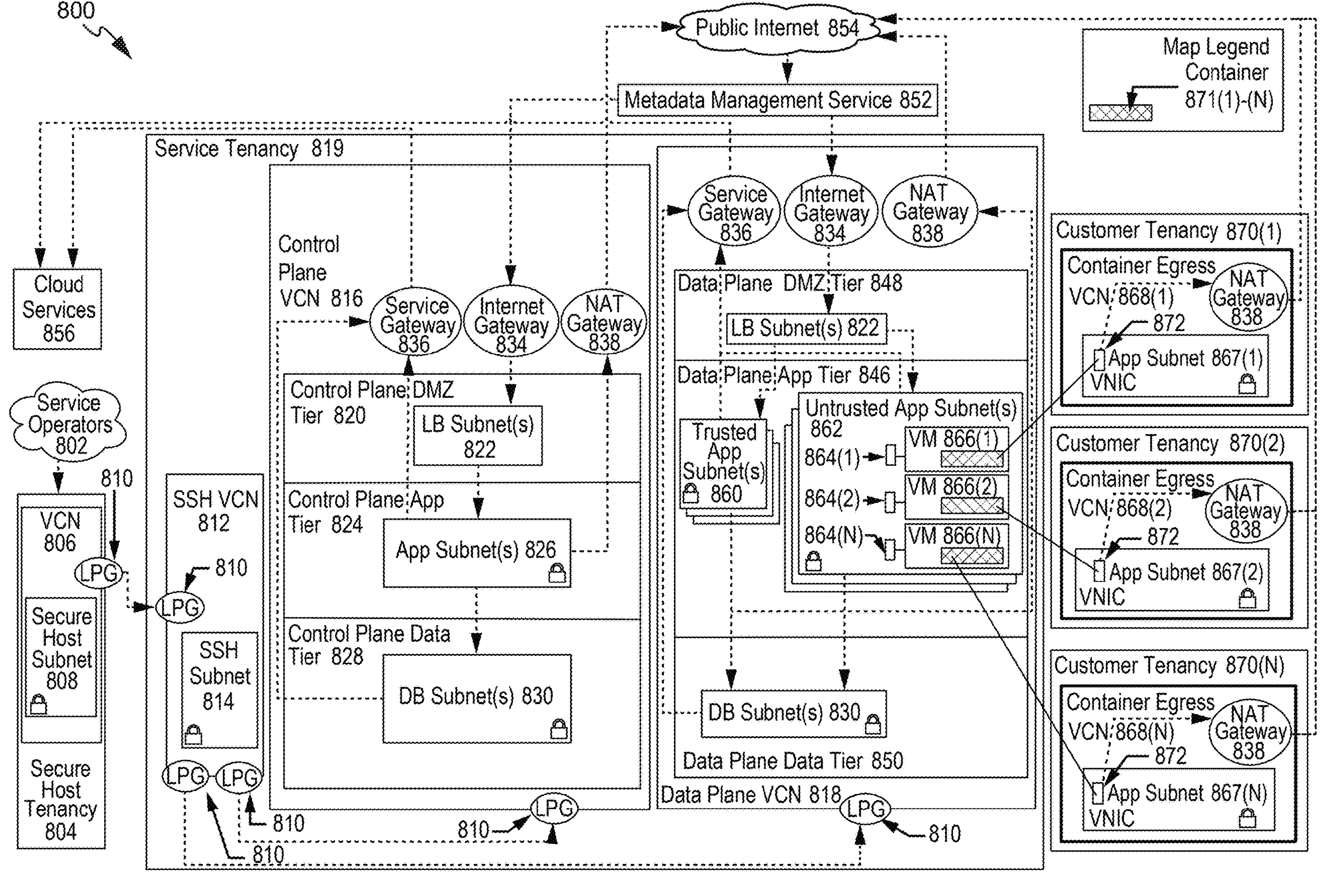
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNS 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
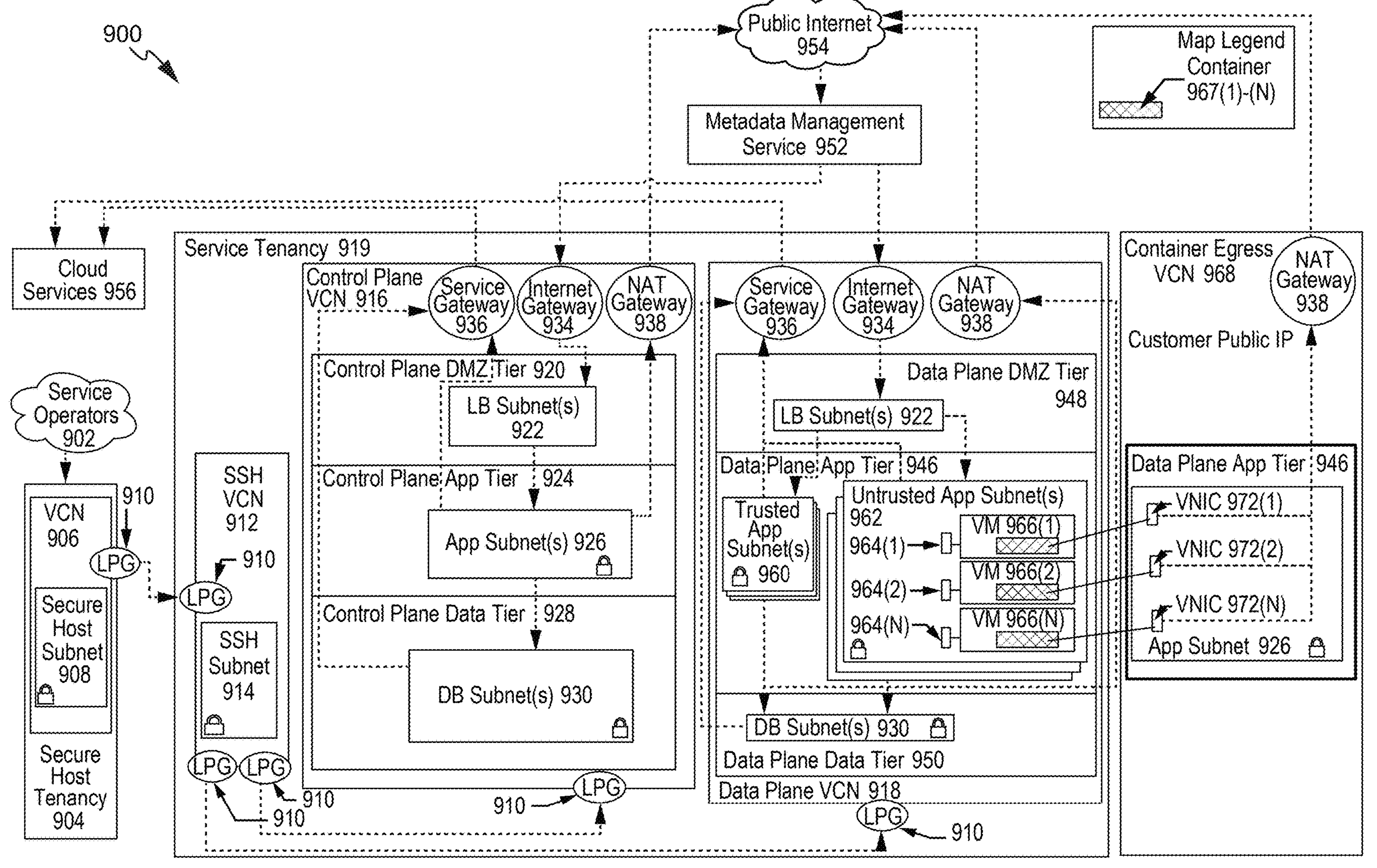
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 630 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 660 of FIG. 8) and untrusted app subnet(s) 962 (e.g., untrusted app subnet(s) 662 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some examples, the pattern illustrated by the architecture of block diagram 900 of FIG. 9 may be considered an exception to the pattern illustrated by the architecture of block diagram 600 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
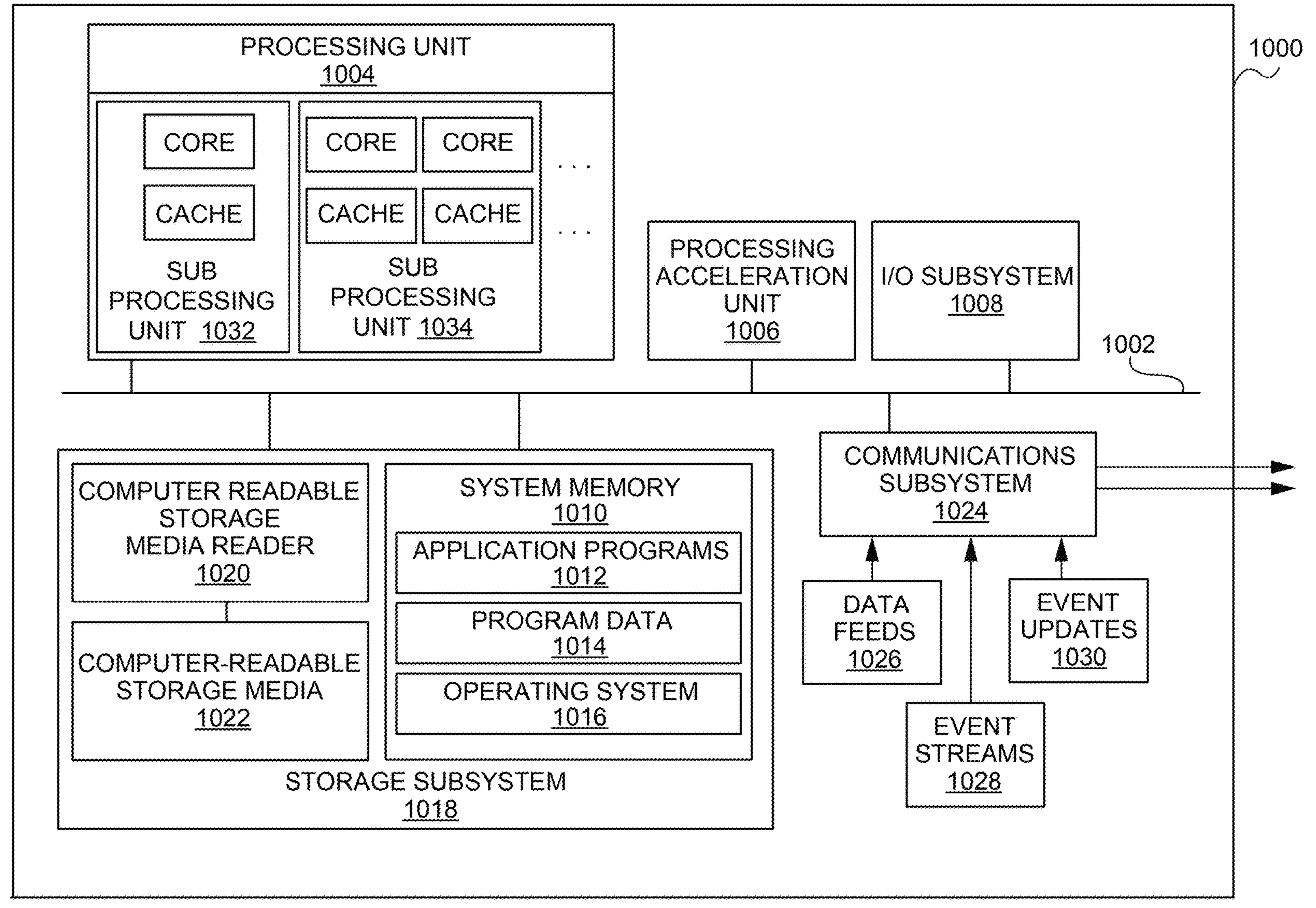
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

accessing original data as text comprising a sequence of words;

constructing input data by labeling the text to identify entities, relations between the entities, and assertion classes associated with the entities;

training a machine learning model, the training including:

inputting the input data to a named entity recognition (NER) module of the machine learning model;

outputting, by the NER module as relation extraction input data, pairs of spans with entity type information to be used for training a relation extraction (RE) module of the machine learning model;

outputting, by the NER module as assertion detection input data, spans with mapped entities, to be used for training an assertion detection (AD) module of the machine learning model, wherein each of the RE module and the AD module is implemented as separate, trainable module within a machine learning model architecture; and training the machine learning model on combined NER, RE, and AD tasks concurrently to generate a trained machine learning model, by training the NER module on the input data, training the RE module on the relation extraction input data, and training the AD module on the assertion detection input data, wherein the training uses a combined loss function that jointly optimizes the NER task, the RE task, and the AD task, and wherein the trained machine learning model is trained to produce, as separate outputs, predicted entities, predicted relations between entities, and predicted assertion classes; and providing the trained machine learning model.

2. The computer-implemented method of claim 1, wherein:

the NER task is modeled as a sequence tagging problem where the input data is provided as a sequence of tokens of length n, and is labeled by one of m distinct entity tags of a group of selected or otherwise available entity tags; and a sequence of entity tags is predicted for every sequence of tokens, such that each token in the input data is mapped to one of the m distinct entity tags of the group of selected or otherwise available entity tags.

3. The computer-implemented method of claim 2, wherein:

after all the tokens in the input data are labeled by entity tags, at least some adjacent tokens with a common entity type label are combined to form spans;

all the spans in the input data are enumerated; and entity types are associated with each span.

4. The computer-implemented method of claim 1, wherein model training parameters are shared between the NER module, the RE module, and the AD module.

5. The computer-implemented method of claim 1, wherein the machine learning model is a multi-layer transformer-based language model, and wherein an initial set of layers is dedicated to the NER module, a subsequent set of layers is dedicated to the RE module, and an identical copy of the subsequent set of layers is dedicated to the AD module.

6. The computer-implemented method of claim 5, wherein a shared layer is interposed between a final layer of the NER module and an initial layer of each of the RE module and the AD module, and wherein the shared layer comprises NER task training parameters that are shared with the RE module and the AD module.

7. The computer-implemented method of claim 1, further comprising:

during inference, receiving, by the trained machine learning model, new text as an input; and predicting, as separate outputs by the trained machine learning model, (a) entities and their types present within the new text, (b) relations between the entities of the new text, and (c) assertion classes associated with the entities of the new text.

8. The computer-implemented method of claim 1, wherein the RE module identifies and classifies relationships between pairs of entity spans using span-based prediction, and the AD module assigns assertion classes to spans corresponding to the entities.

9. The computer-implemented method of claim 1, wherein steps of the computer-implemented method are performed in a cloud-based infrastructure.

10. A system comprising:

one or more data processors; and one or more non-transitory computer readable media storing instructions which, when executed by the one or more data processors, cause the one or more data processors to perform operations including:

obtaining original data as text comprising a sequence of words;

constructing input data by labeling the text to identify entities, relations between the entities, and assertion classes associated with the entities;

training a machine learning model, the training including:

inputting the input data to a named entity recognition (NER) module of the machine learning model;

outputting, by the NER module as relation extraction input data, pairs of spans with entity type information to be used for training a relation extraction (RE) module of the machine learning model;

outputting, by the NER module as assertion detection input data-to, spans with mapped entities, to be used for training an assertion detection (AD) module of the machine learning model, wherein each of the RE module and the AD module is implemented as separate, trainable module within a machine learning model architecture; and training the machine learning model on combined NER, RE, and AD tasks concurrently to generate a trained machine learning model, by training the NER module on the input data, training the RE module on the relation extraction input data, and training the AD module on the assertion detection input data, wherein the training uses a combined loss function that jointly optimizes the NER task, the RE task, and the AD task, and wherein the trained machine learning model is trained to produce, as separate outputs, predicted entities, predicted relations between entities, and predicted assertion classes; and providing the trained machine learning model.

11. The system of claim 10, wherein:

the machine learning model is a multi-layer neural network-based transformer-encoder language model;

an initial number of the layers of the machine learning model is dedicated to the NER module for performing the NER task;

a remaining number of layers of the machine learning model is dedicated to the RE module for performing the RE task; and an identical copy of the remaining number of layers of the machine learning model is dedicated to the AD module for performing the AD task.

12. The system of claim 11, wherein a shared layer resides between a final layer of the NER module and an initial layer of each of the RE module and the AD module, and includes NER task training parameters that are shared with the RE module and the AD module for respectively training the machine learning model to perform the RE task and the AD task.

13. The system of claim 10, wherein the operations further include:

during inference, receiving, by the trained machine learning model, new text as an input; and predicting, as separate outputs by the trained machine learning model, (a) entities and their types present within the new text, (b) relations between the entities of the new text, and (c) assertion classes associated with the entities of the new text.

14. The system of claim 10, wherein the RE module identifies and classifies relationships between pairs of entity spans using span-based prediction, and the AD module assigns assertion classes to spans corresponding to the entities.

15. The system of claim 10, wherein the operations are performed in a cloud-based infrastructure.

16. A computer-program product tangibly embodied in one or more non-transitory machine-readable media, including instructions configured to cause one or more data processors to perform operations including:

obtaining original data as text comprising a sequence of words;

constructing input data by labeling the text to identify entities, relations between the entities, and assertion classes associated with the entities;

training a machine learning model, the training including:

inputting the input data to a named entity recognition (NER) module of athe machine learning model;

outputting, by the NER module as relation extraction input data te, pairs of spans with entity type information to be used for training a relation extraction (RE) module of the machine learning model;

outputting, by the NER module as assertion detection input data, spans with mapped entities, to be used for training an assertion detection (AD) module of the machine learning model, wherein each of the RE module and the AD module is implemented as separate, trainable module within a machine learning model architecture; and training the machine learning model on combined NER, RE, and AD tasks concurrently to generate a trained machine learning model, by training the NER module on the input data, training the RE module on the relation extraction input data, and training the AD module on the assertion detection input data, wherein the training uses a combined loss function that jointly optimizes the NER task, the RE task, and the AD task, and wherein the trained machine learning model is trained to produce, as separate outputs, predicted entities, predicted relations between entities, and predicted assertion classes; and providing the trained machine learning model.

17. The computer-program product of claim 16, wherein the machine learning model is a multi-layer transformer-based language model, and wherein an initial set of layers is dedicated to the NER module, a subsequent set of layers is dedicated to the RE module, and an identical copy of the subsequent set of layers is dedicated to the AD module.

18. The computer-program product of claim 17, wherein a shared layer is interposed between a final layer of the NER module and an initial layer of each of the RE module and the AD module, and wherein the shared layer comprises NER task training parameters that are shared with the RE module and the AD module.

19. The computer-program product of claim 16, wherein the operations further include:

during inference, receiving, by the trained machine learning model, new text as an input; and predicting, as separate outputs by the trained machine learning model, (a) entities and their types present within the new text, (b) relations between the entities of the new text, and (c) assertion classes associated with the entities of the new text.

20. The computer-program product of claim 16, wherein the operations are performed in a cloud-based infrastructure.

* * * * *